US012684549B2

(12) United States Patent
Yoshimura et al.

(10) Patent No.: US 12,684,549 B2
(45) Date of Patent: Jul. 14, 2026

(54) USER EQUIPMENTS, BASE STATIONS AND METHODS FOR MULTI-CELLULAR OPERATION

(71) Applicant: SHARP Kabushiki Kaisha, Sakai City (JP)

(72) Inventors: Tomoki Yoshimura, Camas, WA (US); Zhanping Yin, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 614 days.

(21) Appl. No.: 18/145,170

(22) Filed: Dec. 22, 2022

(65) Prior Publication Data

US 2024/0215007 A1 Jun. 27, 2024

(51) Int. Cl.
*H04W 72/0457* (2023.01)
*H04W 52/36* (2009.01)

(52) U.S. Cl.
CPC ..... *H04W 72/0457* (2023.01); *H04W 52/367* (2013.01)

(58) Field of Classification Search
CPC .......................... H04W 52/367; H04W 52/146; H04W 72/044
See application file for complete search history.

(56) References Cited

U.S. PATENT DOCUMENTS

| | | | | |
|---|---|---|---|---|
| 11,558,827 B1 * | 1/2023 | Patel | .................. | H04W 52/265 |
| 2014/0146775 A1 | 5/2014 | Guan | | |

| | | | | |
|---|---|---|---|---|
| 2015/0334769 A1 | 11/2015 | Kim | | |
| 2016/0353387 A1 * | 12/2016 | Gao | .................... | H04W 52/346 |
| 2018/0343665 A1 | 11/2018 | Yan | | |
| 2019/0229967 A1 * | 7/2019 | Frank | .................. | H04W 52/346 |
| 2021/0176736 A1 | 6/2021 | Harada | | |
| 2022/0109594 A1 * | 4/2022 | Baldemair | .......... | H04W 52/028 |

(Continued)

FOREIGN PATENT DOCUMENTS

| | | | | |
|---|---|---|---|---|
| CN | 117280811 A | * 12/2023 | ............ | H04W 72/04 |
| CN | 117796052 A | * 3/2024 | .......... | H04W 52/243 |

(Continued)

OTHER PUBLICATIONS

3GPP TSG RAN Meeting #97-e, RP-222251, Multi-carrier enhancements for NR, Electronic meeting, Sep. 12-16, 2022.

(Continued)

*Primary Examiner* — Charles T Shedrick
(74) *Attorney, Agent, or Firm* — ScienBiziP, P.C.

(57) ABSTRACT

A wireless terminal comprises receiver circuitry and processor circuitry. The receiver circuitry is configured to receive, over the radio interface, information upon which determination of allocation type determination formula(e) is dependent. The processor circuitry configured to: (1) use the received information to determine which allocation type determination formula(e) is to be used to determine an allocation type; (2) use the allocation type determination formula(e) to determine the allocation type, a type of the allocation type being determined depending on location of an allocated resource block for the uplink channel relative to channel bandwidth; and (3) use the allocation type to determine a parameter for a configured maximum transmission power for an uplink channel upon which an uplink transmission is transmitted.

7 Claims, 10 Drawing Sheets

(56)     References Cited

U.S. PATENT DOCUMENTS

| | | | | |
|---|---|---|---|---|
| 2023/0071327 A1 * | 3/2023 | Hwang | ............... | H04W 52/383 |
| 2023/0085404 A1 * | 3/2023 | Park | .................... | H04W 52/367 |
| | | | | 455/522 |
| 2023/0345389 A1 * | 10/2023 | Yang | .................... | H04L 27/2636 |
| 2024/0214951 A1 | 6/2024 | Yoshimura et al. | | |

FOREIGN PATENT DOCUMENTS

| | | | | | |
|---|---|---|---|---|---|
| CN | 117998559 A | * | 5/2024 | ............ | H04W 52/42 |
| CN | 118785444 A | * | 10/2024 | .......... | H04W 72/541 |
| EP | 4203566 A1 | * | 6/2023 | .......... | H04W 52/367 |
| WO | WO-2020167178 A1 | * | 8/2020 | ......... | H04L 27/2602 |
| WO | WO-2022029806 A1 | * | 2/2022 | .......... | H04L 1/0007 |
| WO | WO-2024002461 A1 | * | 1/2024 | .......... | H04L 5/0066 |

OTHER PUBLICATIONS

U.S. Office Action dated Jun. 17, 2025 issued in U.S. Appl. No. 18/145,177, 18 pp.

* cited by examiner

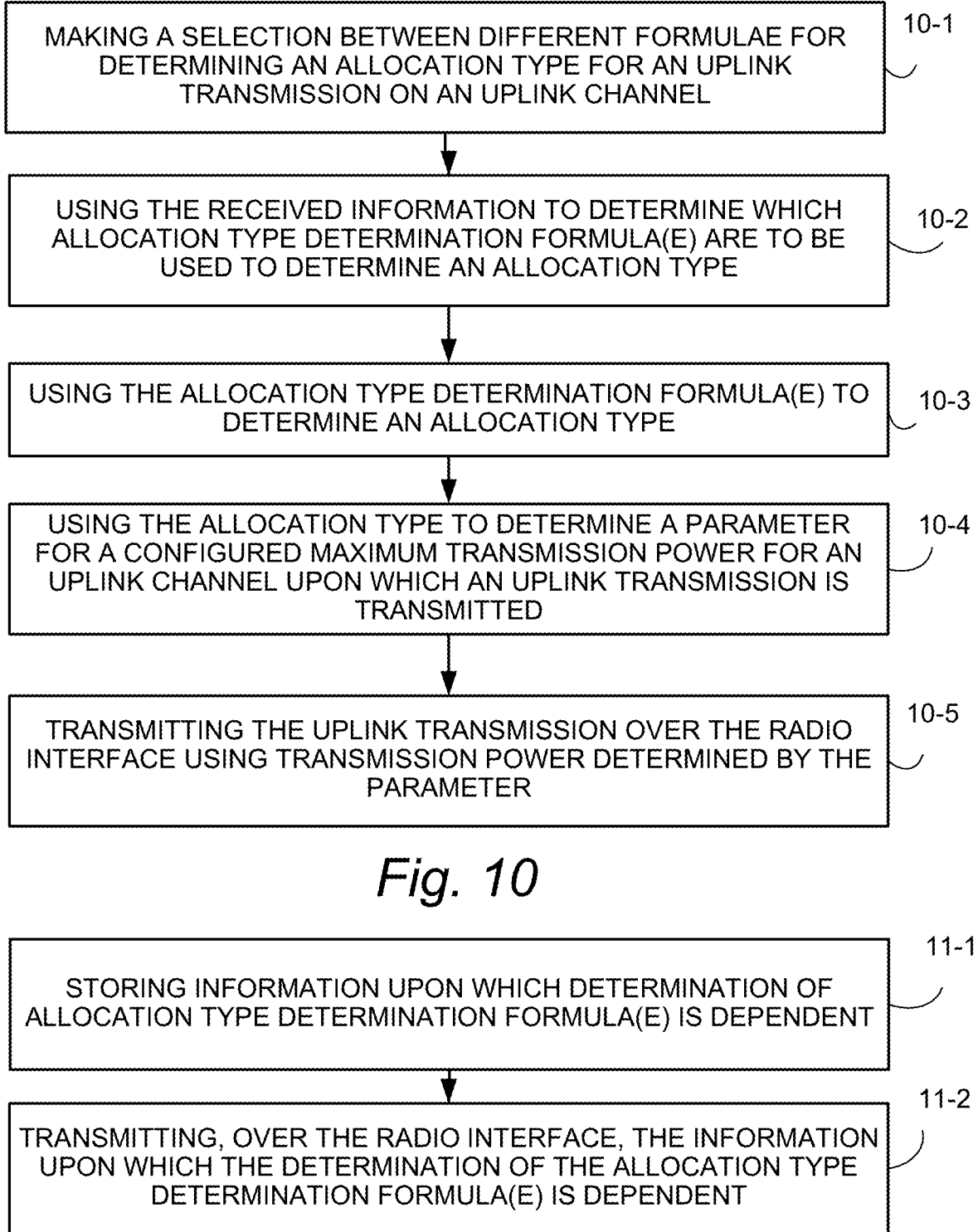

MAKING A SELECTION BETWEEN DIFFERENT FORMULAE FOR DETERMINING AN ALLOCATION TYPE FOR AN UPLINK TRANSMISSION ON AN UPLINK CHANNEL    10-1

USING THE RECEIVED INFORMATION TO DETERMINE WHICH ALLOCATION TYPE DETERMINATION FORMULA(E) ARE TO BE USED TO DETERMINE AN ALLOCATION TYPE    10-2

USING THE ALLOCATION TYPE DETERMINATION FORMULA(E) TO DETERMINE AN ALLOCATION TYPE    10-3

USING THE ALLOCATION TYPE TO DETERMINE A PARAMETER FOR A CONFIGURED MAXIMUM TRANSMISSION POWER FOR AN UPLINK CHANNEL UPON WHICH AN UPLINK TRANSMISSION IS TRANSMITTED    10-4

TRANSMITTING THE UPLINK TRANSMISSION OVER THE RADIO INTERFACE USING TRANSMISSION POWER DETERMINED BY THE PARAMETER    10-5

*Fig. 10*

STORING INFORMATION UPON WHICH DETERMINATION OF ALLOCATION TYPE DETERMINATION FORMULA(E) IS DEPENDENT    11-1

TRANSMITTING, OVER THE RADIO INTERFACE, THE INFORMATION UPON WHICH THE DETERMINATION OF THE ALLOCATION TYPE DETERMINATION FORMULA(E) IS DEPENDENT    11-2

*Fig. 11*

USER EQUIPMENTS, BASE STATIONS AND METHODS FOR MULTI-CELLULAR OPERATION

TECHNICAL FIELD

The technology relates to wireless communications, and particularly to wireless terminals and methods performed thereby for multicarrier operation.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE and is connected via the NG interface to the 5GC. The 5G NR, New Radio, gNB is connected to Access and Mobility Management Function, AMF, and User Plane Function, UPF, in the 5G Core Network, 5GC.

Wireless transmissions from a base station in a direction toward a wireless terminal is referred to as being on the "downlink", DL, transmissions from the wireless terminal in a direction toward the base station is referred to as being on the "uplink", UL. As described in more detail herein, the transmissions may occur in a frame or sub-frame structure which may be conceptualized as a two-dimensional grid. The grid may be structured to have time slots in a first dimension and frequencies or sub-carriers in a second dimension. Time division duplex, TDD, operation occurs when information of the frame or sub-frame is split on a time basis between uplink and downlink. In TDD operation there may be a mapping or assignment, referred to as a TDD pattern, of time slots to uplink and downlink transmissions. Frequency division duplex, FDD, operation occurs when information of the frame or sub-frame is split on a frequency or sub-carrier basis between uplink and downlink.

In a 3GPP-based network, UEs, also referred to as "wireless terminals", are configured with a configured maximum transmission power $P_{CMAX,f,c}$. The configured maximum transmission power $P_{CMAX,f,c}$ is used to control the maximum transmission power for carrier f of a serving cell c. The configured maximum transmission power $P_{CMAX,f,c}$ is set based on the following criteria:

$$P_{CMAX\_L,f,c} \le P_{CMAX,f,c} \le P_{CMAX\_H,f,c}$$

$$P_{CMAX\_L,f,c} = \text{MIN} \{P_{EMAX,c} - \Delta T_{C,c}, (P_{PowerClass} - \Delta P_{PowerClass}) -$$
$$\text{MAX}(\text{MAX}(MPR_c, A-MPR_c) + \Delta T_{IB,c} + \Delta T_{C,c} + \Delta T_{RxSRS}, P-MPR_c)\}$$

$$P_{CMAX\_H,f,c} = \text{MIN} \{P_{EMAX,c}, P_{PowerClass} - \Delta P_{PowerClass}\}$$

where:
$P_{EMAX,c}$ is the value given by RRC signaling.
$\Delta T_{C,c}$ is 1.5 dB or 0 dB.
$P_{PowerClass}$ is the maximum UE power which depends on the UE power class.
$MPR_c$ is maximum power reduction depending on channel bandwidth, allocation type, and modulation type.
$A-MPR_c$ is the value signaled by RRC signaling.
$\Delta_{TIB,c}$ is the additional tolerance for serving cell c specified for carrier aggregation.
$\Delta T_{RxSRS}$ is SRS-specific power requirements.
$P-MPR_c$ is additional power management maximum power reduction.

As an example of the above, $P_{PowerClass}$=26 dB for one UE power class, e.g., power class 2, and $P_{PowerClass}$=23 dB for another UE power class, e.g., power class 3, so that for this example $\Delta P_{PowerClass}$=3 dB or 0 dB.

As a further example, $MPR_c$, for UE power class 3 is determined by Table 1 below.

TABLE 1

| Maximum power reduction (MPR) for power class 3 | | | | |
|---|---|---|---|---|
| | | MPR (dB) | | |
| Modulation | | Edge RB allocations | Outer RB allocations | Inner RB allocations |
| DFT-s-OFDM | Pi/2 BPSK | ≤3.5[1] ≤0.5[2] | ≤1.2[1] ≤0.5[2] | ≤0.2[1] 0[2] |
| | QPSK | ≤1 | | 0 |
| | 16 QAM | ≤2 | | ≤1 |
| | 64 QAM | | ≤2.5 | |
| | 256 QAM | | ≤4.5 | |
| CP-OFDM | QPSK | ≤3 | | ≤1.5 |
| | 16 QAM | ≤3 | | ≤2 |
| | 64 QAM | | ≤3.5 | |
| | 256 QAM | | ≤6.5 | |

NOTE 1:
Applicable for UE operating in TDD mode with Pi/2 BPSK modulation and UE indicates support for UE capability powerBoosting-pi2BPSK and if the IE powerBoostPi2BPSK is set to 1 and 40% or less slots in radio frame are used for UL transmission for bands n40, n41, n77, n78 and n79. The reference power of 0 dB MPR is 26 dBm.
NOTE 2:
Applicable for UE operating in FDD mode, or in TDD mode in bands other than n40, n41, n77, n78 and n79 with Pi/2 BPSK modulation and if the IE powerBoostPi2BPSK is set to 0 and if more than 40% of slots in radio frame are used for UL transmission for bands n40, n41, n77, n78 and n79.

There are 3 allocation types: Edge RB allocations, Outer RB allocations, and Inner RB allocations. The UE determines an allocation of an uplink transmission as "Edge RB allocation" if the allocated resource blocks, RBs, are at the lowermost or uppermost edge of the channel bandwidth, and $L_{CRB}$ is equal to or smaller than a predetermined integer M, such as 2. Here, $L_{CRB}$ is the number of RBs allocated for the uplink transmission.

If the following two conditions are met, the UE determines the allocation as "Inner RB allocation":

$$RB_{Start,Low} \leq RB_{Start} \leq RB_{Start,High}$$

$$L_{CRB} \leq \mathrm{ceil}(N_{RB}/2)$$

where:

$$RB_{Start,Low} = \max(1, \ \mathrm{floor}(L_{CRB}/2)).$$

$RB_{Start,High}=N_{RB}-RB_{Start,Low}-L_{CRB}N_{RB}$ is the number of RBs for a maximum transmission bandwidth configuration for a given channel bandwidth.

ceil(DX) represents a ceiling function for a real number DX.

floor(CX) represents a floor function for a real number CX.

For example, ceil (DX) may be a function that provides the smallest integer within the range not less than the real number DX, and floor (CX) may be a function that provides the largest integer within a range that does not exceed the real number CX.

Either the transmission bandwidth configuration or the channel bandwidth may correspond to the bandwidth of the carrier or a cell. For example, the maximum transmission bandwidth configuration may correspond to the number of resource blocks in the carrier. For example, the maximum transmission bandwidth configuration may correspond to the number resource blocks in the cell.

If the UE did not determine the allocation either as "Edge RB allocation" or "Inner RB allocation", the UE determines the allocation as "Outer RB allocation".

FIG. 2 shows example multicarrier operation. Multicarrier operation involves control and operation of a number of contiguous or noncontiguous component carriers (several physical layers) using a single medium access control, MAC, instantiation. In the multicarrier frequency range of FIG. 2, three bandwidths are defined and illustrated with reference to the Y or vertical axis: BW1, BW2, and BW3. As used herein, BW1, BW2, and BW3 are also referred to as bandwidth regions, with bandwidth (region) BW2 being intermediate with respect to frequency between BW1 and BW2. The technology disclosed herein is not confined to three bandwidth regions, and more than three bandwidth regions may exist. In the time domain, FIG. 2 illustrates by way of non-limiting example two time domain regions: region 1 and region 2. Greater than two time domain regions may be provided. In region 1, the UE is scheduled to transmit an uplink transmission, shown as uplink transmission 1, within the BW1. In region 2, the UE is scheduled to transmit another uplink transmission, shown as uplink transmission 2, over BW1, BW2, and BW3. Uplink transmission 2 has a feature that the three bandwidths are aggregated.

One of the motivations for the example multicarrier operation is that an access node, e.g., a gNB, might want to adjust its uplink bandwidth to meet the required data rate at a given time considering the actual traffic condition while the access node also wants to utilize frequency resource(s) in the guard bandwidth between the two adjacent bandwidths. Therefore, an assumption in FIG. 2 is that, in the region 1, the access node may transmit downlink signals in BW1 and BW3 while the access node is receiving the uplink transmission 1.

In wireless communication, frequency bandwidth for a system, e.g., or a cell or a BW, should be limited to certain bandwidth, e.g., 10, 20, 40, 100 MHz. If the carrier frequency is set to 3.5 GHZ and the bandwidth is set to 100 MHZ, the system is supposed to operate within 3.45 GHz and 3.55 GHz. To meet such a bandwidth limitation, filtering is applied to signals before transmission. However, the filtering is not optimal in practice, and it produces out-of-bandwidth (out-of-band) emissions, e.g., frequencies, to adjacent systems or transmissions. So, if BW2 is to transmit, the transmission produces a certain amount of emission to BW1 and BW3, which deteriorates the system performance of BW1 and BW3.

In 3GPP, out-of-emission requirements are specified in TS38.101. When a channel adjacent to BW2, e.g., BW1 and BW3, is to be used for downlink transmission, the out-of-band emission would affect reception quality of a UE which receives the downlink transmission in BW1 or BW3. Therefore, an out-of-band emission requirement is imposed on the wireless terminal.

FIG. 3 shows an example allocation of frequency bandwidth for a cell from a gNB perspective. In FIG. 3, Cell1 is associated with a bandwidth, or maximum transmission bandwidth configuration, starting at the lower edge of BW1 and ending at the upper edge of BW3. From the UE perspective, uplink transmission 1 may be regarded as "Inner RB allocation", which has the smallest allowable maximum power reduction. However, adjacent to the uplink transmission 1. Cell1 may perform downlink transmission. To meet the out-of-band emission requirement, larger maximum power reduction, MPR, values than values for "Inner RB allocation" would be needed for the uplink transmission 1.

In one example $N_{RB}=273$, $N_{RB,BW1}=106$, $N_{RB,BW2}=51$, $N_{RB,BW3}=106$, each guard bandwidth has 5 RBs, and $L_{CRB}=51$ for uplink transmission 1, $RB_{Start,Low}=50$, $RB_{Start,High}=273-50-50=173$, and $RB_{Start}=111$. Thus, the uplink transmission 1 is considered as "Inner RB allocation", which has the smallest allowable power reduction. However, considering that BW1 and BW3 may be used to transmit downlink signals, "Inner RB allocation" for the uplink transmission 1 is not appropriate for the UE since the stringent out-of-band emission requirements should be met for the uplink transmission 1.

What is needed are methods, apparatus, and/or techniques to deal with power allocation for radio resources for uplink channels that preferably satisfy out-of-band emission requirements in multicarrier and/or multi-cell operation.

SUMMARY

In some of its example aspects the technology disclosed herein concerns a wireless terminal of a cellular telecommunication system. The wireless terminal comprises processor circuitry configured to make a selection between different formulae for determining an allocation type for an uplink transmission on an uplink channel. The allocation type is a parameter utilized by the processor to determine a parameter for a configured maximum transmission power for a carrier for the uplink channel upon which the uplink transmission is transmitted. A type of the allocation type is determined depending on location of an allocated resource block for the uplink channel relative to channel bandwidth.

The wireless terminal may also comprise transmitter circuitry configured to transmit the uplink transmission over the radio interface using transmission power determined by the configured maximum transmission power parameter. Methods of operating such wireless terminals are also provided.

In another of its example aspects the technology disclosed herein concerns a wireless terminal of a cellular telecommunication system. The wireless terminal comprises processor circuitry configured to make a selection between different criteria for determining an allocation type for an uplink transmission on an uplink channel. The allocation type is a parameter utilized by the processor to determine a parameter for configured maximum transmission power parameter for the uplink channel upon which the uplink transmission is transmitted. A type of the allocation type is determined depending on location of an allocated resource block for the uplink channel relative to channel bandwidth. The wireless terminal may also comprise transmitter circuitry configured to transmit the uplink transmission over the radio interface using transmission power determined in dependence on the configured maximum transmission power parameter. Methods of operating such wireless terminals are also provided.

In another of its example aspects the technology disclosed herein concerns a wireless terminal of a cellular telecommunication system. The wireless terminal comprises receiver circuitry and processor circuitry. The receiver circuitry is configured to receive, over the radio interface, information upon which determination of allocation type determination formula(e) is dependent. The processor circuitry configured to: (1) use the received information to determine which allocation type determination formula(e) is to be used to determine an allocation type; (2) use the allocation type determination formula(e) to determine the allocation type, a type of the allocation type being determined depending on location of an allocated resource block for the uplink channel relative to channel bandwidth; and (3) use the allocation type to determine a parameter for a configured maximum transmission power for an uplink channel upon which an uplink transmission is transmitted. The wireless terminal may also comprise transmitter circuitry configured to transmit the uplink transmission over the radio interface using transmission power determined by the parameter. Methods of operating such wireless terminals are also provided.

In another of its example aspects the technology disclosed herein concerns an access node of a radio access network of a cellular telecommunication system which communicates over a radio interface with a wireless terminal. In a basic example embodiment and mode the access node comprises processor circuitry and transmitter circuitry. The processor circuitry is configured to obtain information upon which determination of allocation type determination formula(e) is dependent. The transmitter circuitry is configured to transmit, over the radio interface, the information upon which the determination of the allocation type determination formula (e) is dependent. Methods of operating such wireless terminals are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 10 is a flowchart showing example acts or steps performed by an example wireless terminal of FIG. 9.

FIG. 11 is a flowchart showing example acts or steps performed by an example access node of FIG. 9.

DETAILED DESCRIPTION

Figure 1:
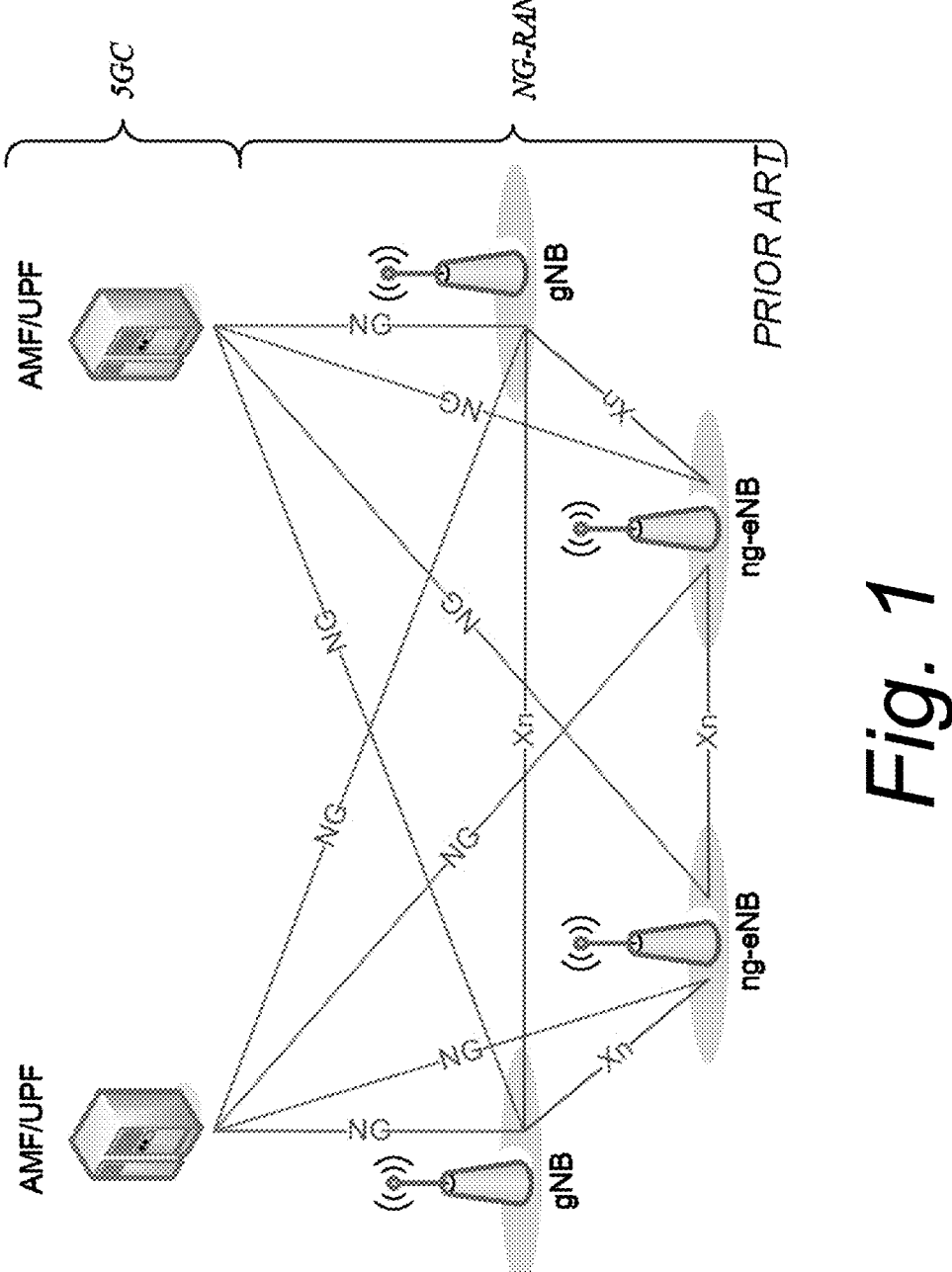
FIG. 1 is a diagrammatic view of overall architecture for a 5G New Radio system.
Figure 2:
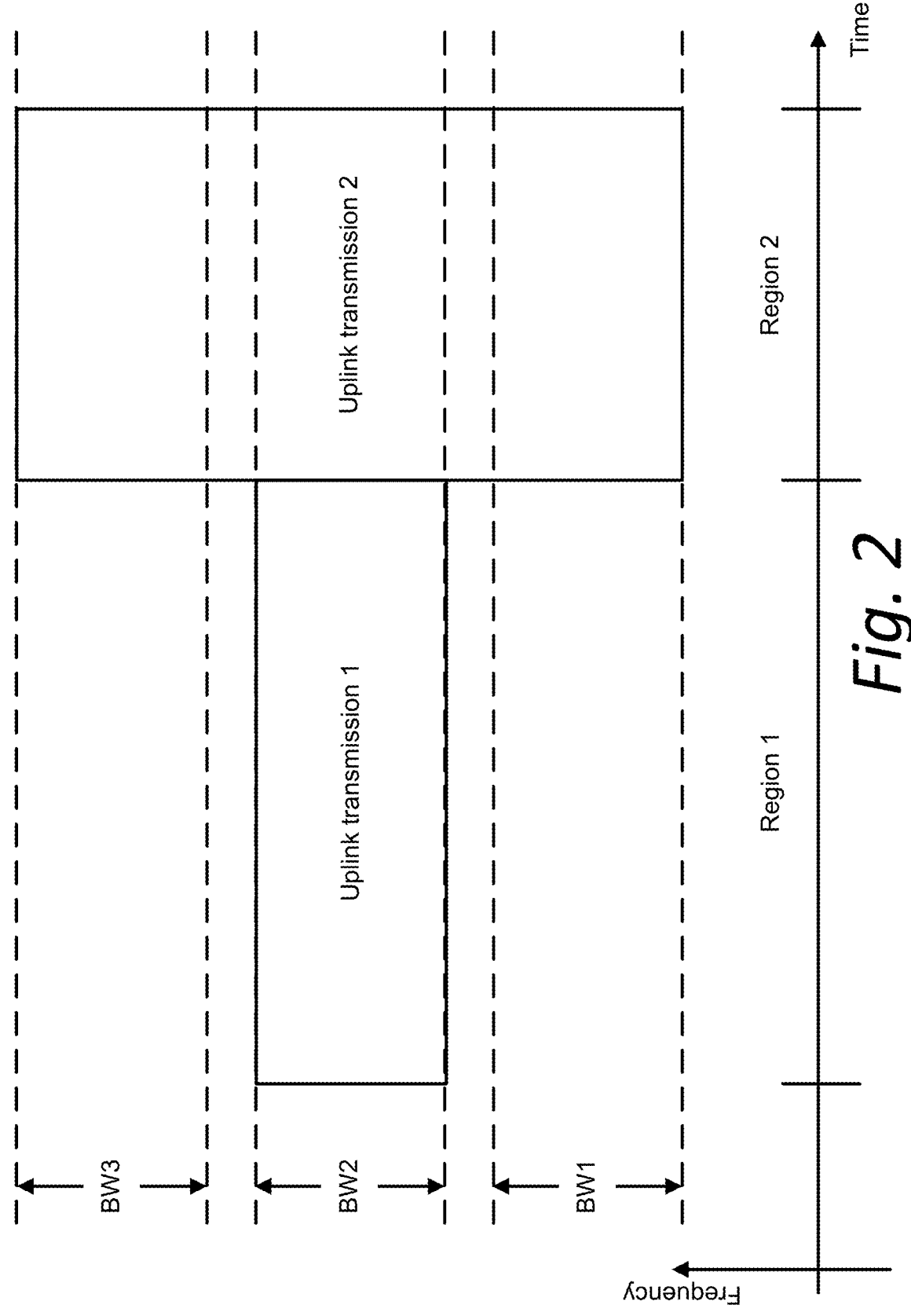
FIG. 2 is a diagrammatic view showing an example multicarrier operation.
Figure 3:
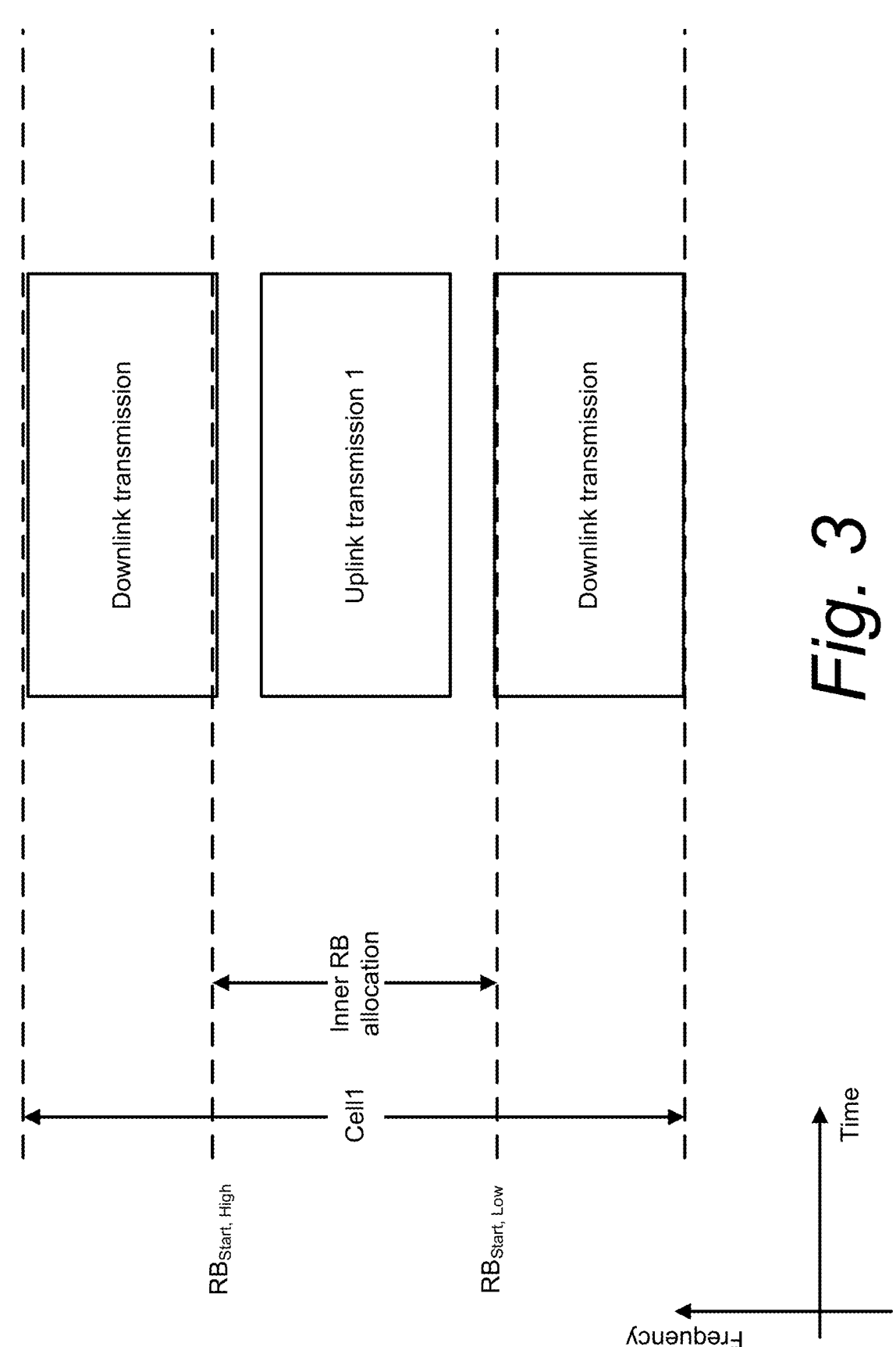
FIG. 3 is a diagrammatic view showing example allocation of frequency bandwidth in a multicarrier operation from an access node perspective.

In the following description, for purposes of explanation and not limitation, specific details are set forth such as particular architectures, interfaces, techniques, etc. to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether such computer or processor is explicitly shown.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN. "Multi-cellular" refers to operation using plural cells.

A core network, CN, such as core network (CN) may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, a core network (CN) may comprise one or more management entities, which may be an Access and Mobility Management Function, AMF.

1.0 Power Control in Multicarrier Operation

Figure 4:
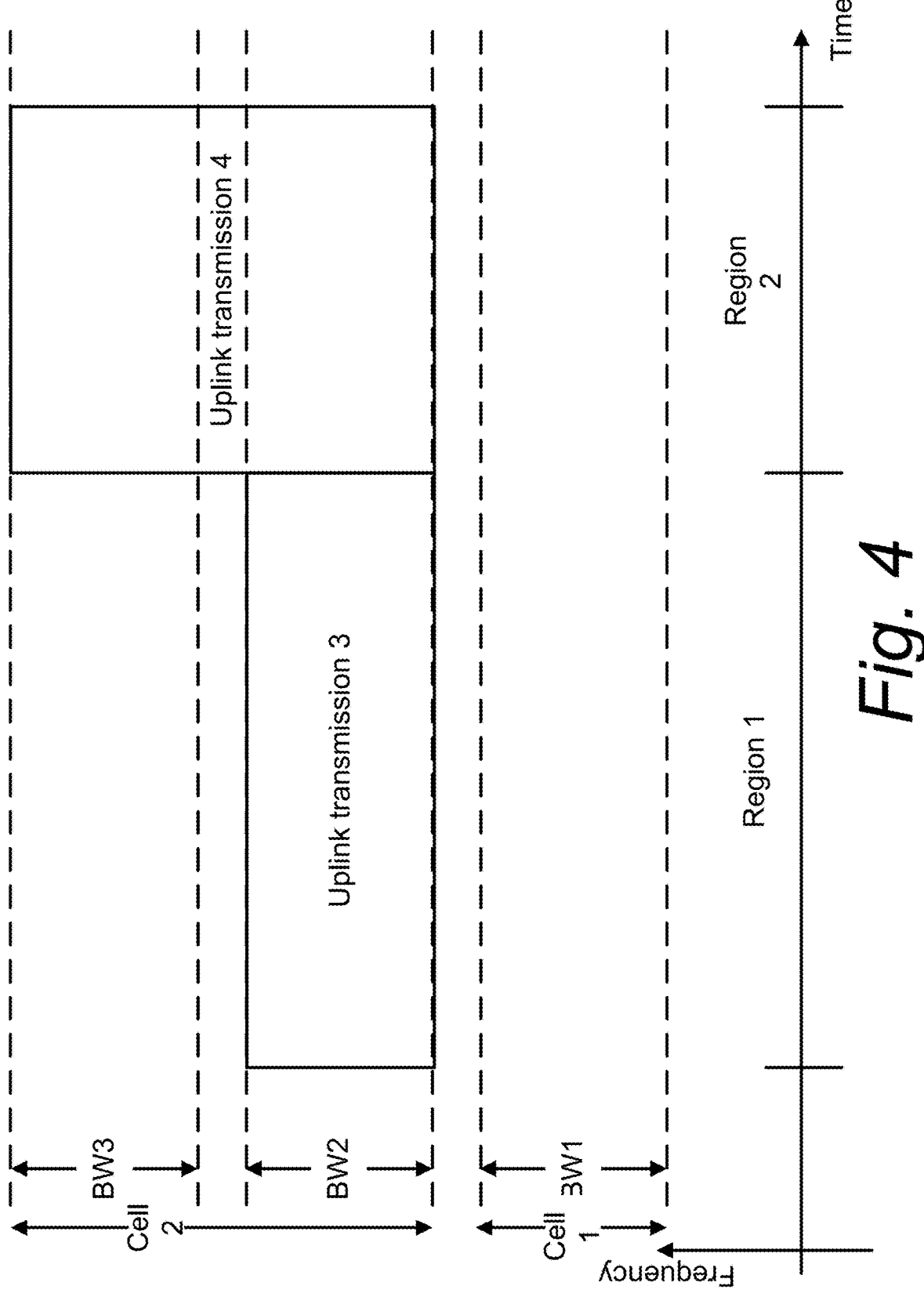
FIG. 4 is a diagrammatic view of an example scenario of multicarrier operation for an illustrative example embodiment and mode of the technology disclosed herein.

FIG. 4 is another example of multicarrier operation. In FIG. 4, Cell1 is associated with BW1 and Cell2 is associated with BW2 and BW3. Uplink transmission 3 is confined within BW2 and Uplink transmission 4 is spread over BW2 and BW3. One example aspect of the technology disclosed herein is that a UE is equipped or provided with appropriate maximum power reduction, MPR, values for multicarrier operation, and particularly in a situation such as that illustrated by way of example in FIG. 4.

1.1 Multicarrier Power Control Example Structure

Figure 5:
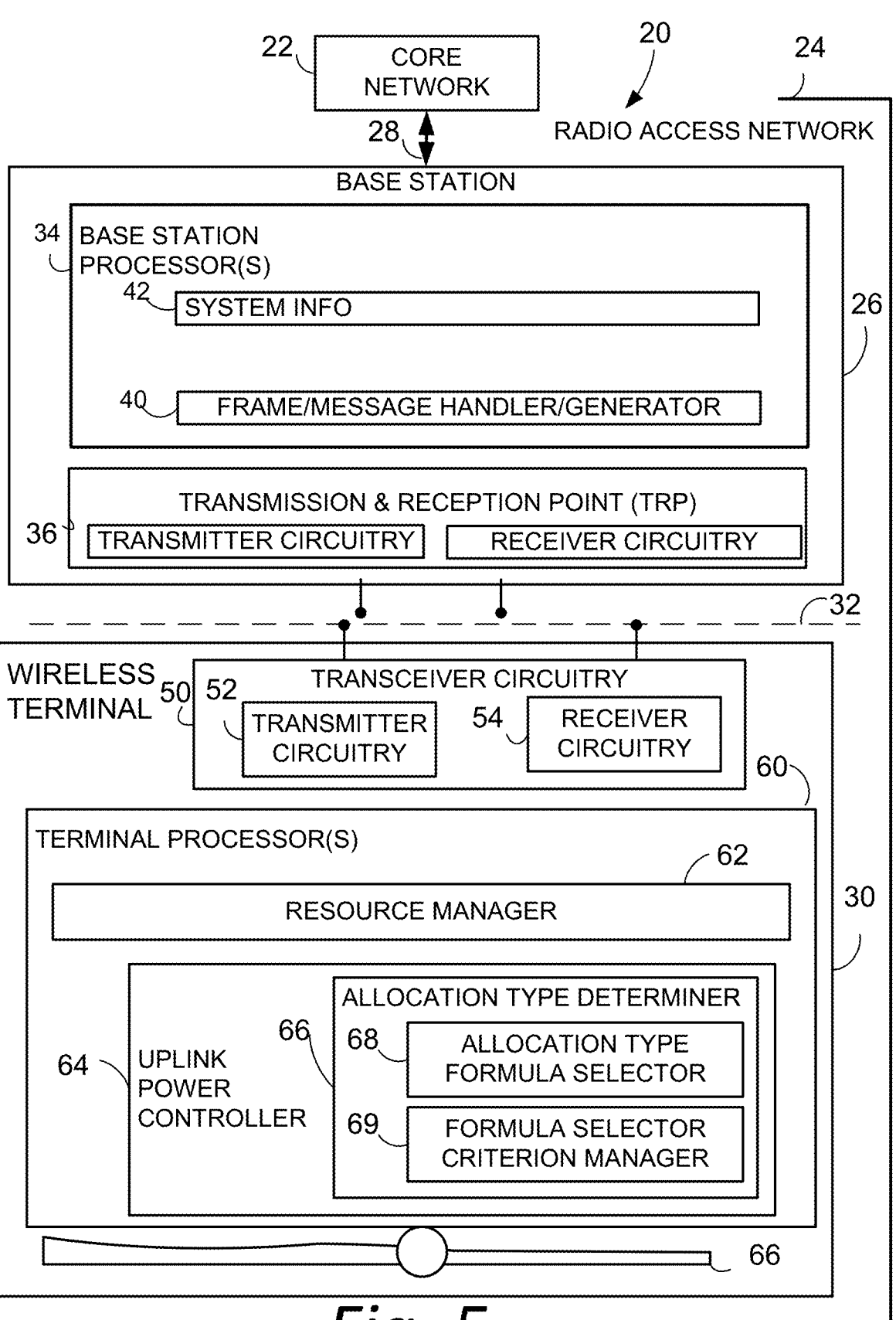
FIG. 5 is a schematic view of a communications system showing a core network, a radio access network, with the radio access network including a wireless terminal that controls uplink transmission power in accordance with a first example embodiment and mode.

FIG. 5 shows a system diagram of an example communications network 20 wherein a wireless terminal makes a selection between different formulae for determining an allocation type for an uplink transmission on an uplink channel, the allocation type being a parameter utilized by the processor to determine or control a parameter for a configured maximum transmission power for a carrier for the uplink channel upon which the uplink transmission is transmitted. Expressions provided above showing criteria for setting the configured maximum transmission power $P_{CMAX,f,c}$ are examples of how the allocation type is utilized by the processor to determine or control a parameter for a configured maximum transmission power. Network 20, which may be a 5G network, for example, comprises core network 22 connected to at least one radio access network 24. The radio access network 24 in turn comprises one or more radio access network (RAN) nodes, such as example access node 26, also called base station node 26, which is shown as being connected to the core network 22 by wireline(s) 28. The base station node 26 serves at least one cell.

The radio access network, RAN, 24 typically comprises plural access nodes, one example access nodes 26 being illustrated as a base station node in FIG. 5. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), a relay node, a mobile relay node, or some other similar terminology.

FIG. 5 shows the radio access network 24, and base station node 26 through its cell in particular communicating with wireless terminal 30 across a radio or air interface 32. The base station node 26 may, and usually does, communicate with plural wireless terminals across the air interface 32. Only one wireless terminal 30 is shown for sake of simplicity, it being understood that other wireless terminals may be provided and may operate in similar manner as the wireless terminal 30 herein illustrated.

FIG. 5 shows base station node 26 as comprising base station processor circuitry which may comprise one or more base station processors 34, as well as base station transceiver circuitry 36. As illustrated in FIG. 5, the base station transceiver circuitry 36 may be a transmission and reception point (TRP). The transmission and reception point (TRP) 36 may further comprise transmitter circuitry and receiver circuitry. The base station processors 34 may comprise frame/message handler/generator 40 which prepares and generates information including user data and messages, e.g., signaling, for transmission over the radio interface 32, as which also processes information received over the radio interface 32. The base station processors 34 may also comprise a system information block, SIB, generator 42 which serves to generate or at least store system information which is broadcast over the radio interface 32.

The base station node 26 may be structured essentially as shown in FIG. 5 or may have architecture such as split architecture comprising a central unit and one or more distributed units that comprise mobile termination (MT). The base station processor(s) may include one or more TRPs.

Communication between radio access network (RAN) 22 and wireless terminal over the radio interface 32 may occur on various layers. Layer 1 includes radio layer 1 or the physical layer. Higher layers, e.g., layers higher than Layer 1 may include radio layer 2 and radio resource control layer 3. Layer 1 communication may occur by utilization of "resources". Reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource may occur in the context of a "frame" of information that is typically formatted and prepared, e.g., by a node. A frame, which may have both downlink portion(s) and uplink portion(s), is communicated between the base station and the wireless terminal. Each frame may comprise plural subframes. For example, in the time domain, a 10-millisecond frame consists of ten one millisecond subframes. A subframe is divided into one or more slots (so that there are thus a multiple of 10 slots in a frame). The transmitted signal in each slot is described by a resource grid comprised of resource elements (RE). Each column of the two-dimensional grid represents a symbol (e.g., an OFDM symbol) from node to wireless terminal. Each row of the grid represents a subcarrier. A resource element, RE, is the smallest time-frequency unit for transmission in the subframe. That is, one symbol on one sub-carrier in the sub-frame comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The –frequency resource supported by the standard today is a set of plural subcarriers in one OFDM symbols (e.g., plural resource elements (RE)) and is called a resource block (RB). A resource block may comprise, for example, 12 resource elements, i.e., 12 subcarriers and 7 symbols.

In 5G New Radio ("NR"), a frame consists of 10 millisecond, milli-second, duration. A frame consists of 10 subframes with each having 1 ms duration like LTE. Each subframe consists of $2^\mu$ slots. Each slot can have either 14 (normal CP) or 12 (extended CP) OFDM symbols. A Slot is a typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. A mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot. html, which is incorporated herein by reference.

As used herein, "serving cell frequency resource" refers to a plurality of radio resources which may radio resources comprising layer 1 communications between base station node 26 and wireless terminal 30. As such, "serving cell frequency resource" encompasses and includes a frame, having examples described above, or a resource grid, or plural carriers, for example. The serving cell frequency resource typically includes a control region. In New Radio, the control region can be placed in any region in time/frequency domain, whereas in some earlier LTE versions the control region should be preferably located in the beginning of a subframe. The control region may include scheduling information. An example of scheduling information is a PDCCH with a downlink control indication, DCI, format. The scheduling information may describe or reference other portions of the serving cell frequency resource. The other portion of serving cell frequency resource that may be described or referenced by the scheduling information may be one or more physical channels. An example of scheduling information 46 is a PDCCH with a DCI format. An example physical channel is a physical downlink shared channel, PDSCH.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

FIG. 5 also shows various example constituent components and functionalities of wireless terminal 30. For example, FIG. 5 shows wireless terminal 30 as comprising terminal transceiver circuitry 50. The transceiver circuitry 50 in turn may comprise terminal transmitter circuitry 52 and terminal receiver circuitry 54. The terminal transceiver circuitry 50 may include antenna(e) for the wireless transmission. Terminal transmitter circuitry 52 may include, e.g., amplifier(s), modulation circuitry and other conventional transmission equipment. Terminal receiver circuitry 54 may comprise, e.g., amplifiers, demodulation circuitry, and other conventional receiver equipment.

FIG. 5 further shows wireless terminal 30 also comprising wireless terminal processor circuitry, e.g., one or more wireless terminal processor(s) 60. The wireless terminal 30, e.g., wireless terminal processor(s) 60, may comprise resource manager 62 and transmission power controller 64. The resource manager 62 may also be referred to or function as a frame/message generator/handler. The transmission power controller 64 serves to control the uplink transmission power for a carrier for an uplink channel upon an uplink transmission is transmitted. As explained herein, the uplink transmission power is dependent upon a parameter herein referred to as maximum power reduction, MPR. The wireless terminal processor(s) 60 of wireless terminal 30 is further configured to use the parameter maximum power reduction parameter to determine or control a configured maximum transmission power parameter, upon which transmission power for the uplink transmission for the uplink channel is dependent. As further explained herein, the maximum power reduction, MPR, may be dependent upon several parameters, including a parameter known as allocation type. As also explained herein, a "type" of the allocation type being determined depending on location of an allocated resource block for the uplink channel relative to channel bandwidth. Thus, in view of the significance of the allocation type parameter, the transmission power controller 64 may further comprise or be associated with allocation type determiner 66. As explained below, the allocation type determiner 66 may, in an example non-limiting implementation, comprise allocation type formulae selector 68 which serves to select between plural formulae or techniques for determining the allocation type. The allocation type determiner 66 and allocation type formulae selector 68 may, in an optional and non-limiting implementation, also work together with formulae selector criterion manager 69.

The wireless terminal 30 may also comprise user interfaces 66, including one or more user interfaces. Such user interfaces may serve for both user input and output operations, and may comprise (for example) a keyboard, a mouse, a screen such as a touch screen that can both display information to the user and receive information entered by the user. The user interface 66 may also include other types of devices, such as a speaker, a microphone, or a haptic feedback device, for example.

1.2 Multicarrier Power Control Example Operation

Figure 6:
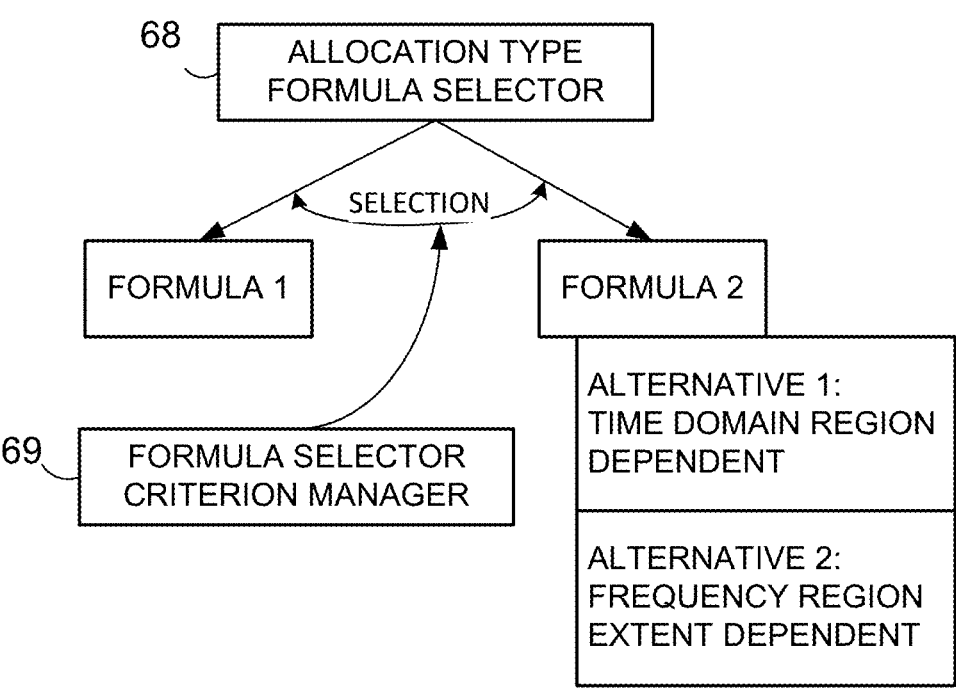
FIG. 6 is a diagrammatic view of a procedure of selection of an allocation type formulae by the wireless terminal of FIG. 5.

FIG. 6 illustrates diagrammatically the allocation type formulae selector 68 choosing between two formulae for determining the allocation type for an uplink transmission. The two formulae involved in the example selection of FIG. 6 are shown as Formula 1 and Formula 2. More than two formulae may be involved in or be candidates for selection for use in determining the allocation type. As used herein, "formula" may encompass or comprise any suitable technique or procedure for determining an allocation type, including but not limited to an executable algorithm, logic tree or logic sequence, computer program or computer code, state machine control routine, sequence of acts or operations. Moreover, as shown in FIG. 6, one or more formulae, such as formula 2, for example, may have plural alternative implementations. For example, and as explained herein, one alternative implementation may be dependent upon a time domain region for the uplink transmission, while another (second) implementation may be dependent upon extent of the uplink transmission with respect to one or more bandwidth frequency regions.

Figure 7:
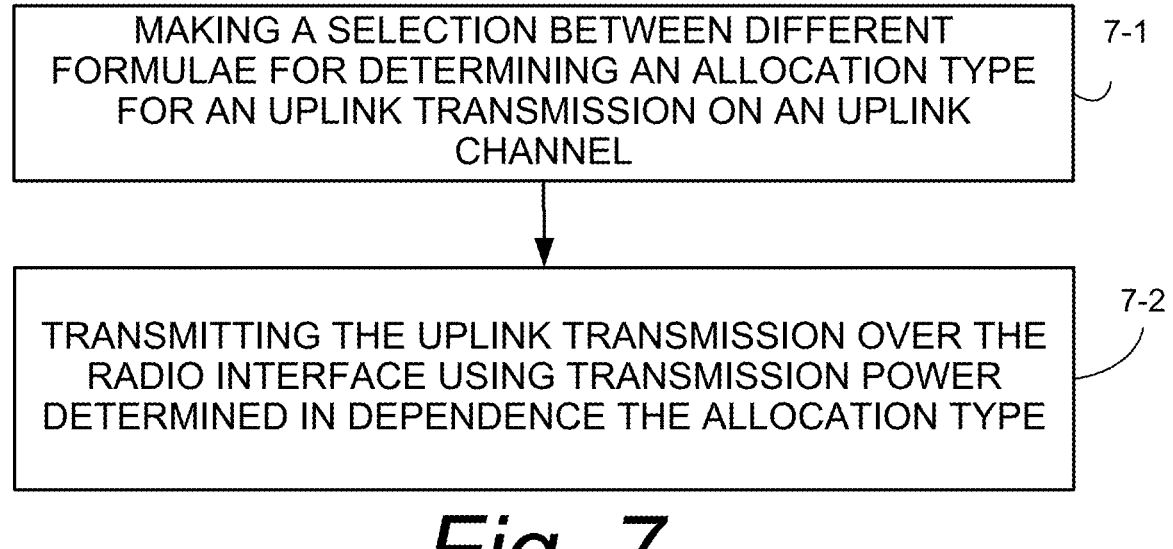
FIG. 7 is a flowchart showing example acts or steps performed by the wireless terminal of FIG. 5.

FIG. 7 shows example acts, or steps, performed by the wireless terminal 30 of FIG. 5 in a basic example embodiment and mode. Act 7-1 comprises the wireless terminal making a selection between different formulae for determining an allocation type for an uplink transmission on an uplink channel. As explained herein, the allocation type is a parameter utilized to determine or control the configured maximum transmission power parameter upon which the transmission power for the uplink transmission on the uplink channel is dependent. A "type" of the allocation type being determined depending on location of an allocated resource block for the uplink channel relative to channel bandwidth. In a non-limiting implementation, Act 7-1 may be performed by wireless terminal processor(s) 60, e.g., by allocation type determiner 66 or allocation type formulae selector 68. Act 7-2 comprises transmitting the uplink transmission over the radio interface using the transmission power determined in dependence the configured maximum transmission power parameter, which in turn is dependent upon the allocation type.

Thus, in an example embodiment and mode wireless terminal 30 is equipped with two different formulae to determine allocation type for uplink transmission.

Formula 1 is described as follows:

The UE determines an allocation of an uplink transmission as "Edge RB allocation" if the allocated RBs are at the lowermost or uppermost edge of the channel bandwidth, and $L_{CRB}$ is equal to or smaller than 2.

Otherwise, if $RB_{Start,Low} \leq RB_{Start} \leq RB_{Start,High}$, and $L_{CRB} \leq \text{ceil}(N_{RB}/2)$, the UE determines the allocation as "Inner RB allocation".

Formula 2 is one of the following alternatives:

Formula 2a

The UE determines an allocation as a specific allocation type (e.g., "Edge RB allocation") regardless of whether the allocated RBs are at the lowermost or uppermost edge of the channel bandwidth, and regardless of $L_{CRB}$ and $N_{RB}$.

Formula 2b

The UE determines an allocation of an uplink transmission as "Edge RB allocation" if the allocated RBs are at the lowermost or uppermost edge of the channel bandwidth, and $L_{CRB}$ is equal to or smaller than 2.

Otherwise, the UE determines the allocation of the uplink transmission as a specific allocation type (e.g., "Outer RB allocation type") regardless of $L_{CRB}$ and $N_{RB}$.

Formula 2c

The UE uses formula 1 with assuming that the channel bandwidth as BW2 and $N_{RB}$ as the number of RBs in BW2.

Further, the UE is equipped with switching criteria for the formula 1 and 2.

Criteria 1

The UE uses formula 1 in the region 1 and the UE uses formula 2 in the region 2 where The UE determines a time resource allocated for the uplink transmission as the region 1 when the time resource is confined in a time duration where BW2 is for uplink transmission and BW1 and BW3 is for downlink transmission. The UE may determine the time duration based on signaling from gNB, e.g., via RRC signaling.

Criteria 2

The UE determines a time resource allocated for the uplink transmission as the region 1 when the frequency resource for the uplink transmission is confined in BW2.

Criteria 3

The UE is signalled that the region 1 or region 2 for each uplink transmission via a DCI format which schedules the uplink transmission.

Criteria 4

The UE is signalled one or more BWs for a cell. A formula to be used for an uplink transmission is dependent on whether the uplink transmission is confined in a BW or not. For example, if the uplink transmission is confined within the BW, the UE applies the formula 2. For example, if the uplink transmission is not confined within the BW, the UE applies the formula 1.

In an example embodiment and mode that includes formulae selection criterion manager 69, the wireless terminal 30 may make a selection between different criteria for determining an allocation type for an uplink transmission on an uplink channel. For example, and as shown in FIG. 6 by way of non-limiting example, the formulae selection criterion manager 69 may select between the four examples of criterion listed above.

2.0 Power Control in Multi-Cellular Operation

Figure 8:
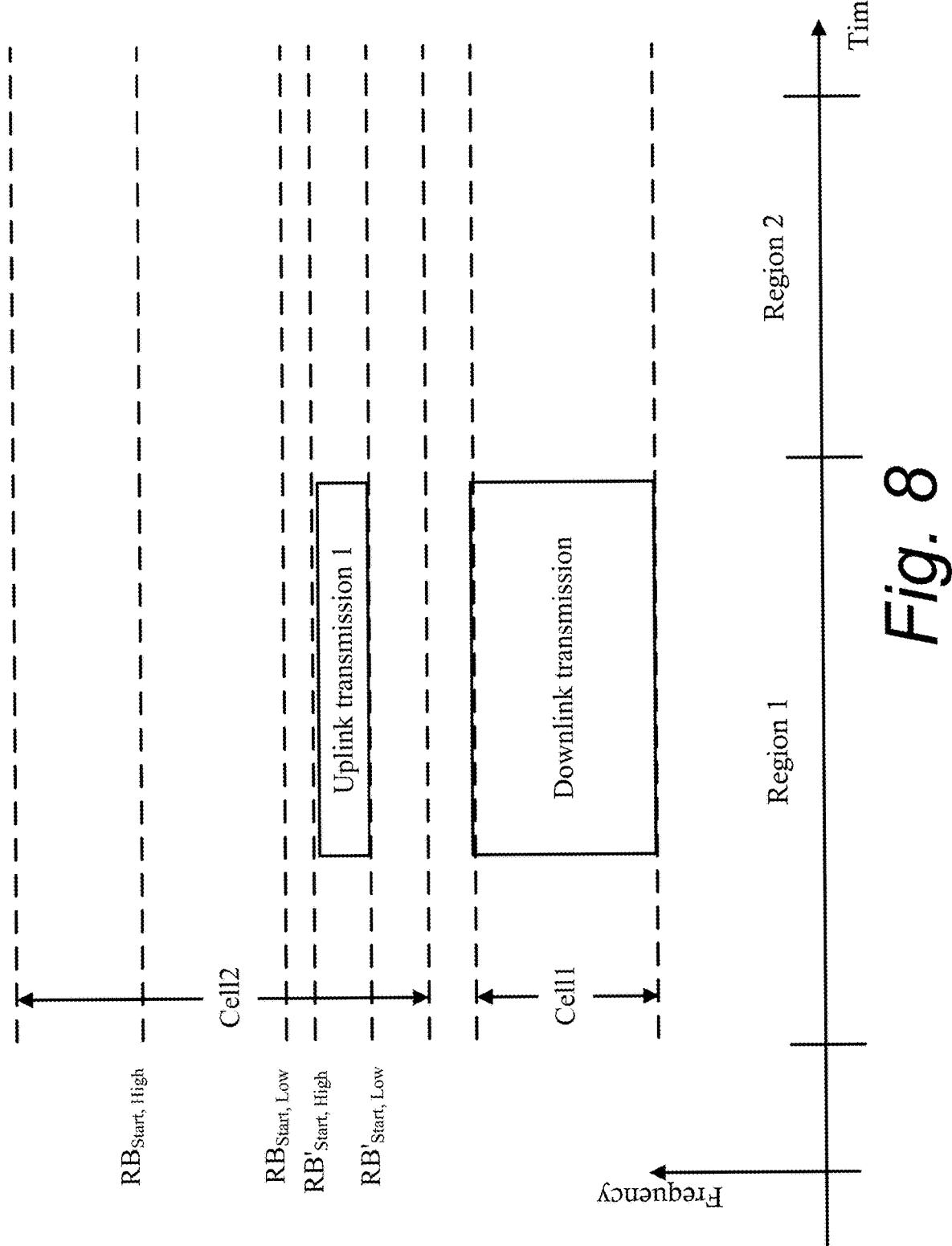
FIG. 8 is a diagrammatic view of example scenario of multicarrier operation for an illustrative example embodiment and mode of the technology disclosed herein.

FIG. 8 is an example of Serving cell operation at the cell2. In the cell2, if the uplink transmission 1 is within the region 1, the UE may assume the channel bandwidth as BW2 and $N_{RB}$ as the number of resource blocks, RBs, in BW2. In that case, the "Inner RB allocation" criteria for the bandwidth region BW2 may be different from the "Inner RB allocation" criteria for the cell2. FIG. 8 describes that the bandwidth from $RB'_{start,Low}$ to $RB'_{start,High}$ as bandwidth for the "Inner RB allocation" for the BW2 whereas the bandwidth from $RB_{start,Low}$ to $RB_{start,High}$ represents the bandwidth for the "Inner RB allocation" for the cell2. If the $RB_{start}$ of the uplink transmission 1 is confined within the "Inner RB allocation" for the BW2, the UE may determine MPR based on "Inner RB allocation" which has the smallest MPR value. On the other hand, from the cell2 perspective, the uplink transmission is still "Outer RB allocation". Therefore, to ensure to meet the out-of-band emission requirement outside of the cell2, the UE should be allowed to use the MPR value associated with "Outer RB allocation" even when the uplink transmission 1 is "Inner RB allocation" from the BW2 perspective.

In view of considerations including those mentioned above, in accordance with other example aspects of the technology disclosed herein a UE is supplied by an access node with information which facilies an appropriate maximum power reduction, MPR, determination formula for neighboring cell treatment, e.g., multi-cellular operation, in a situation such as that illustrated by way of example in FIG. 8. In multiple embodiments described herein, a wireless terminal receives, over a radio interface, information upon which determination of allocation type determination formula(e) is dependent. The wireless terminal, e.g., processor circuitry of the wireless terminal, then uses the received information to determine which allocation type determination formula(e) are to be used to determine an allocation type. The wireless terminal then uses the allocation type determination formula(e) to determine an allocation type; and further uses the allocation type to determine or control the configured maximum transmission power parameter upon which the transmission power for the uplink channel upon which the uplink transmission is dependent. Expressions provided above showing show criteria for setting the configured maximum transmission power $P_{CMAX,f,c}$ are examples of how the allocation type is utilized by the processor to determine or control a parameter for a configured maximum transmission power. In a first example implementation the received information upon which the determination of the allocation type determination formula€ is dependent comprises an indication of the allocation type determination formula€. For example, in the first example implementation the received information may be used to determine either (1) one of a first allocation type determination formula and a second allocation type determination formula, or (2) both a first allocation type determination formula and a second allocation type determination formula. In a second example implementation the received information upon which the determination of the allocation type determination formula€ is dependent comprises an identification of multiple bandwidth regions for a cell, and wherein the processor circuitry is configured to determine which allocation type determination formula€ is to be used to determine an allocation type depending on to which of the multiple bandwidth regions the uplink transmission is confined.

2.2 Multi-Cellular Power Control Example Structure

Figure 9:
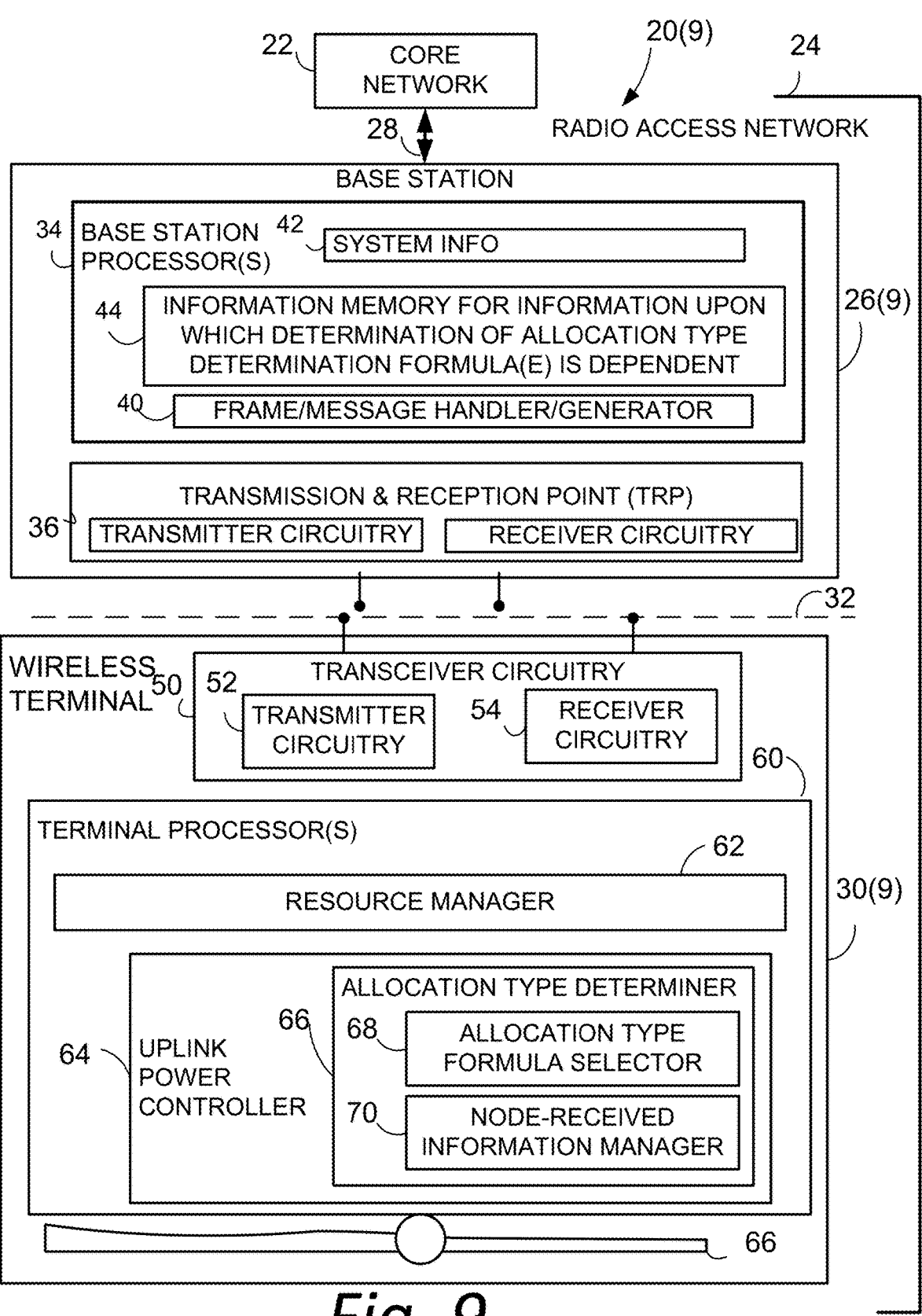
FIG. 9 is a schematic view of a communications system showing a core network, a radio access network, with the radio access network including a wireless terminal that controls uplink transmission power in accordance with a second example embodiment and mode.

FIG. 9 shows a system diagram of an example generic communications network 20(9) according to the second example embodiment and mode wherein a wireless terminal receives, from an access node of a radio access node, information upon which the determination of the allocation type determination formula€ is dependent. Network 20(9), which may be a 5G network, for example, comprises core network 22 connected to at least one radio access network 24. The radio access network 24 in turn comprises one or more radio access network (RAN) nodes, such as example access node 26(9), also called base station node 26(9), which is shown as being connected to the core network 22 by wireline(s) 28. The base station node 26(9) serves at least one cell.

The radio access network, RAN, 24 typically comprises plural access nodes, one example access nodes 26(9) being illustrated as a base station node in FIG. 9. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), a relay node, a mobile relay node, or some other similar terminology.

FIG. 9 shows the radio access network 24, and base station node 26(9) through its cell in particular communicating with wireless terminal 30(9)(9) across a radio or air interface 32. The base station node 26(9) may, and usually docs, communicate with plural wireless terminals across the air interface 32. Only one wireless terminal 30(9) is shown for sake of simplicity, it being understood that other wireless terminals may be provided and may operate in similar manner as the wireless terminal 30(9) herein illustrated.

FIG. 9 shows base station node 26(9) as comprising base station processor circuitry which may comprise one or more base station processors 34, as well as base station transceiver circuitry 36. As illustrated in FIG. 9, the base station transceiver circuitry 36 may be a transmission and reception point (TRP). The transmission and reception point (TRP) 36 may further comprise transmitter circuitry and receiver circuitry. The base station processors 34 may comprise frame/message handler/generator 40 which prepares and generates information including user data and messages, e.g., signaling, for transmission over the radio interface 32, as which also processes information received over the radio interface 32. The base station processors 34 may also comprise a system information block, SIB, generator 42 which serves to generate or at least store system information which is broadcast over the radio interface 32. In addition, base station processors 34 may also comprise information memory 44 which stores information which a wireless terminal may use to make a determination of allocation type determination formula€. In other words, information upon which determination of allocation type determination formula€ is dependent. The base station node 26(9) may either generate the information stored in information memory 44 or obtain the information from the core network 22.

The base station node 26(9) may be structured essentially as shown in FIG. 9 or may be a node having architecture such as split architecture comprising a central unit and one or more distributed units that comprise mobile termination (MT). The base station processor(s) may include one or more TRPs.

Communication between radio access network (RAN) 22 and wireless terminal over the radio interface 32 may occur on various layers. Layer 1 includes radio layer 1 or the physical layer. Higher layers, e.g., layers higher than Layer 1 may include radio layer 2 and radio resource control layer 3. Layer 1 communication may occur by utilization of "resources". Reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource may occur in the context of a "frame" of information that is typically formatted and prepared, e.g., by a node. A frame, which may have both downlink portion(s) and uplink portion(s), is communicated between the base station and the wireless terminal. Each frame may comprise plural subframes. For example, in the time domain, a 10-millisecond frame consists of ten one millisecond subframes. A subframe is divided into one or more slots (so that there are thus a multiple of 10 slots in a frame). The transmitted signal in each slot is described by a resource grid comprised of resource elements (RE). Each column of the two-dimensional grid represents a symbol (e.g., an OFDM symbol) from node to wireless terminal. Each row of the grid represents a subcarrier. A resource element, RE, is the smallest time-frequency unit for transmission in the subframe. That is, one symbol on one sub-carrier in the sub-frame comprises a resource element (RE) which is uniquely defined by an index pair (k, l) in a slot (where k and/are the indices in the frequency and time domain, respectively). In other words, one symbol on one sub-carrier is a resource element (RE). Each symbol comprises a number of sub-carriers in the frequency domain, depending on the channel bandwidth and configuration. The −frequency resource supported by the standard today is a set of plural subcarriers in one OFDM symbols (e.g., plural resource elements (RE)) and is called a resource block (RB). A resource block may comprise, for example, 12 resource elements, i.e., 12 subcarriers and 7 symbols.

In 5G New Radio ("NR"), a frame consists of 10 millisecond, milli-second, duration. A frame consists of 10 subframes with each having 1 ms duration like LTE. Each subframe consists of 2" slots. Each slot can have either 14 (normal CP) or 12 (extended CP) OFDM symbols. A Slot is a typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. A mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

As used herein, "serving cell frequency resource" refers to a plurality of radio resources which may radio resources comprising layer 1 communications between base station node 26(9) and wireless terminal 30(9). As such, "serving cell frequency resource" encompasses and includes a frame, having examples described above, or a resource grid, or plural carriers, for example. The serving cell frequency resource typically includes a control region. In New Radio, the control region can be placed in any region in time/frequency domain, whereas in some earlier LTE versions the control region should be preferably located in the beginning of a subframe. The control region may include scheduling information. An example of scheduling information is a PDCCH with a downlink control indication, DCI, format. The scheduling information may describe or reference other portions of the serving cell frequency resource. The other portion of serving cell frequency resource that may be described or referenced by the scheduling information may be one or more physical channels. An example of scheduling information 46 is a PDCCH with a DCI format. An example physical channel is a physical downlink shared channel, PDSCH.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

FIG. 9 also shows various example constituent components and functionalities of wireless terminal 30(9). For example, FIG. 9 shows wireless terminal 30(9) as comprising terminal transceiver circuitry 50. The transceiver circuitry 50 in turn may comprise terminal transmitter circuitry 52 and terminal receiver circuitry 54. The terminal transceiver circuitry 50 may include antenna€ for the wireless transmission. Terminal transmitter circuitry 52 may include, e.g., amplifier(s), modulation circuitry and other conventional transmission equipment. Terminal receiver circuitry 54 may comprise, e.g., amplifiers, demodulation circuitry, and other conventional receiver equipment.

FIG. 9 further shows wireless terminal 30(9) also comprising wireless terminal processor circuitry, e.g., one or more wireless terminal processor(s) 60. The wireless terminal 30(9), e.g., wireless terminal processor(s) 60, may comprise resource manager 62 and transmission power controller 64. The resource manager 62 may also be referred to or function as a frame/message generator/handler. The transmission power controller 64 serves to control the uplink transmission power for a carrier for an uplink channel upon an uplink transmission is transmitted. As explained herein, the uplink transmission power is dependent upon a parameter herein referred to as maximum power reduction, MPR. The wireless terminal processor(s) 60 of wireless terminal 30(9) is further configured to use the maximum power reduction parameter to determine or control the configured maximum transmission power parameter, upon which the transmission power for the uplink channel upon which uplink transmission is transmitted is dependent. # As further explained herein, the maximum power reduction, MPR, may be dependent upon several parameters, including a parameter known as allocation type. As also explained herein, a "type" of the allocation type being determined depending on location of an allocated resource block for the uplink channel relative to channel bandwidth. Thus, in view of the significance of the allocation type parameter, the transmission power controller 64 may further comprise or be associated with allocation type determiner 66. As explained below, the allocation type determiner 66 may, in an example non-limiting implementation, comprise allocation type formulae selector 68 which serves to select between plural formulae or techniques for determining the allocation type. In the example implementations of the second example embodiment and mode described herein, the allocation type formulae selector 68 may use the information received from the access node to determine which allocation type determination formulae are to be used to determine an allocation type. Accordingly, in FIG. 8 the allocation type formulae selector 68 is shown as comprising and/or working in conjunction with information manager 70, also depicted as node-received information manager, since it operates upon the information received from base station node 26 upon which determination of allocation type determination formulae is dependent.

The wireless terminal 30(9) may also comprise user interfaces 66, including one or more user interfaces. Such user interfaces may serve for both user input and output operations, and may comprise (for example) a keyboard, a mouse, a screen such as a touch screen that can both display information to the user and receive information entered by the user. The user interface 66 may also include other types of devices, such as a speaker, a microphone, or a haptic feedback device, for example.

2.2 Multi-Cellular Power Control Example Operations

FIG. 10 shows example acts, or steps, performed by the generic wireless terminal 30(9) of FIG. 9 in a basic example embodiment and mode. Act 10-1 comprises the wireless terminal receiving, over the radio interface, information upon which determination of allocation type determination formula is dependent. In a non-limiting implementation, act 10-1 may be performed by wireless terminal receiver circuitry 54. Act 10-2 comprises the wireless terminal using the received information to determine which allocation type determination formula€ is to be used to determine an allocation type. Act 10-3 comprises the wireless terminal using the allocation type determination formula to determine an allocation type. As described herein, a type of the allocation type may be determined depending on location of an allocated resource block for the uplink channel relative to channel bandwidth. Act 10-4 comprises using the allocation type to determine one or more parameters upon which the transmission power for an uplink channel upon which an uplink transmission is transmitted is dependent. Such parameters may include the maximum power reduction, MPR, parameter and the configured maximum transmission power parameter which depends on the MPR. In a non-limiting implementation, acts 10-2 through and including act 10-4 may be performed by wireless terminal processor(s) 60. Act 10-5 comprises transmitting the uplink transmission over the radio interface using transmission power determined in dependence on the allocation type. As used herein, "independence on the allocation type" includes the fact that the transmission power may be dependent upon the configured maximum transmission power parameter, which in turn may be dependent on the maximum power reduction parameter, MPR, which in turn may be dependent on the allocation type.

FIG. 11 shows example acts, or steps, performed by the generic access node/base station node 26(9) of FIG. 9 in a basic example embodiment and mode. Act 11-1 comprises the access node generating or obtaining and then storing information upon which determination of allocation type determination formula€ is dependent. As indicated above, the information may be stored in information memory 44. Act 11-2 comprise the access node transmitting, over the radio interface, the information upon which the determination of the allocation type determination formula€ is dependent.

The second example embodiment and mode of FIG. 9-FIG. 11 may be carried out in differing implementations. In other words, the wireless terminal 30(9) is equipped or provided with one of the following solutions with two different formulae to determine allocation type for uplink transmission. In a first example implementation the received information upon which the determination of the allocation type determination formula€ is dependent comprises an indication of the allocation type determination formula€. In a second example implementation the received information upon which the determination of the allocation type determination formula€ is dependent comprises an identification of multiple bandwidth regions for a cell, and wherein the processor circuitry is configured to determine which allocation type determination formula is to be used to determine an allocation type depending on to which of the multiple bandwidth regions the uplink transmission is confined.

2.2.1 Mutli-Carrier First Implementation

In the first example implementation the received information upon which the determination of the allocation type determination formula€ is dependent comprises an indication of the allocation type determination formula€. In being an "indication", the received information may be used, for example, to determine either (1) one of a first allocation type determination formula and a second allocation type determination formula, or (2) both a first allocation type determination formula and a second allocation type determination formula.

In the first example implementation, the UE 30(9) is signalled, e.g., by base station node 26(9), which formula of the formula 1 and formula 2 should be applied for an uplink transmission. In other words, the received information upon which the determination of the allocation type determination formula€ is dependent comprises an indication of the allocation type determination formula€. As used herein, an "indication" may be an identification of or information pointing to or indicative of one of more formulas. For example, the indication may be a name, code, or value representing or associated with a formula.

In the first example implementation, either of the following may occur:

The signalling may indicate formula 1 or formula 2.

The signalling may indicate formula 1 and formula 2 or formula 1.

If the UE is signalled to use formula 1 and formula 2, the UE determines MPR value 1 based on the formula 1 and MPR value 2 based on the formula 2, and the UE selects one of them. For example, the UE selects the largest MPR value among the value 1 and value 2.

2.2.2 Mutli-Carrier Second Implementation

In the second example implementation the received information upon which the determination of the allocation type determination formula€ is dependent comprises an identification of multiple bandwidth regions for a cell. In the second example implementation the wireless terminal processor circuitry is configured to determine which allocation type determination formulae is to be used to determine an allocation type depending on to which of the multiple bandwidth regions the uplink transmission is confined. For the second example implementation, either of the following may occur:

The UE is signalled multiple BWs for a cell. A set of one or more formulae to be used for an uplink transmission is dependent on which BW the uplink transmission is confined.

2a: For example, if the uplink transmission is confined within a BW which is located at the edge of the cell among the multiple BWs, the UE uses formula 2. For example, if the uplink transmission is confined within a BW which is not located at the edge of the cell among the multiple BWs, the UE uses formula 1.

2b: For example, if the uplink transmission is confined within a BW which is located at the edge of the cell among the multiple BWs, the UE uses formula 1 and formula 2. For example, if the uplink transmission is confined within a BW which is not located at the edge of the cell among the multiple BWs, the UE uses formula 1.

In either or both implementations of the second example embodiment and mode, formula 1 and formula 2 may be as described with reference to the first example embodiment and mode.

3.0 EXAMPLE EMBODIMENTS

Example Embodiment 1: A wireless terminal of a cellular telecommunication system, the wireless terminal communicating over a radio interface with an access node of a radio access network, the wireless terminal comprising:

processor circuitry configured to make a selection between different formulae for determining an allocation type for an uplink transmission on an uplink channel, the allocation type being a parameter utilized by the processor to determine a parameter for a configured maximum transmission power for a carrier for the uplink channel upon which the uplink transmission is transmitted, a type of the allocation type being determined depending on location of an allocated resource block for the uplink channel relative to channel bandwidth.

Example Embodiment 2: The wireless terminal of Example Embodiment 1, further comprising transmitter circuitry configured to transmit the uplink transmission over the radio interface using transmission power determined by the configured maximum transmission power parameter.

Example Embodiment 3: The wireless terminal of Example Embodiment 1, wherein in accordance with one of the different formulae the allocation type is determined to be:

an edge resource block allocation in a case that (1) the allocated resource blocks are at a lowermost or uppermost edge of the channel bandwidth and (2) a number of resource blocks ($L_{CRB}$) allocated for the uplink transmission is equal to or smaller than predefined integer M;

an inner resource block allocation in a case that (1) $RB_{Start,Low} \leq RB_{Start} \leq RB_{Start,High}$, and (2) $L_{CRB} \leq$ ceil ($N_{RB}/M$), wherein $$BR_{Start,Low} = \max(1, \text{floor}(L_{CRB}/M));$$

$$RB_{Start,High} = N_{RB} - RB_{Start,Low} - L_{CRB};$$

$N_{RB}$ is a number of resource blocks for a maximum transmission bandwidth configuration for a given channel bandwidth;

ceil(DX) represents a ceiling function for a real number DX; and floor(CX) represents a floor function for a real number CX.

Example Embodiment 4: The wireless terminal of Example Embodiment 1, wherein the allocation type is determined according to one of the following alternatives of one of the different formulae:

according to a first alternative the allocation type is determined to be a specific allocation type regardless of whether the allocated resource blocks are at the lowermost or uppermost edge of the channel bandwidth, and regardless of (1) a number of resource blocks ($L_{CRB}$) allocated for the uplink transmission and (2) a number $N_{RB}$ of resource blocks for a maximum transmission bandwidth configuration for a given channel bandwidth;

according to a second alternative the allocation type is determined to be:

an edge resource block allocation in a case that (1) the allocated resource blocks are at a lowermost or an uppermost edge of the channel bandwidth, and (2) $L_{CRB}$ is equal to or smaller than a predefined integer M;

a specific allocation type regardless of $L_{CRB}$ and $N_{RB}$ for all other cases;

according to a third alternative, when the channel is an intermediate channel in a frequency range between two other channels and $N_{RB}$ is the number of resource blocks in the intermediate channel, the allocation type is determined to be:

an edge RB allocation in a case that (1) the allocated resource blocks are at a lowermost or uppermost edge of the channel bandwidth and (2) the number of resource blocks ($L_{CRB}$) allocated for the uplink transmission is equal to or smaller than the predefined integer M;

an inner RB allocation in a case that (1) $RB_{Start,Low} \leq RB_{Start} \leq RB_{Start,High}$, and (2) $L_{CRB} \leq$ ceil ($N_{RB}/M$), wherein $$B_{Start,Low} = \max(1, \text{floor}(L_{CRB}/M)); \text{ and}$$

$$RB_{Start,High} = N_{RB} - RB_{Start,Low} - L_{CRB};$$

ceil(DX) represents a ceiling function for a real number DX; and floor(CX) represents a floor function for a real number CX.

Example Embodiment 5: The wireless terminal of Example Embodiment 4, wherein the specific allocation type is one of:

an edge resource block allocation;

an outer resource block allocation; and, an inner resource block allocation.

Example Embodiment 6: The wireless terminal of Example Embodiment 4, wherein the predefined integer M is 2.

Example Embodiment 7: The wireless terminal of Example Embodiment 1, wherein the allocation type is a parameter utilized by the processor to determine a parameter maximum power reduction, and wherein the processor circuitry is further configured to use the parameter maximum power reduction to determine the transmission power for the carrier for the uplink channel upon which the uplink transmission is transmitted.

Example Embodiment 8: The wireless terminal of Example Embodiment 1, wherein the processor circuitry is configured make the selection between a first formula and a second formula for determining the allocation type in accordance with one or more of the following criteria:

a time domain region in which a time resource for the uplink transmission is allocated;

whether the uplink transmission is confined to a frequency bandwidth region or not.

Example Embodiment 9: The wireless terminal of Example Embodiment 8, wherein processor circuitry is configured make the selection of the first formula in a first time domain region and to make the selection of the second formula in a second time domain region, and wherein the processor circuitry determines the time resource allocated for the uplink transmission as being in the first time domain region when the time resource is confined in a time duration and an intermediate bandwidth region BW2 between bandwidth regions BW2 and BW3 is for uplink transmission and wherein the bandwidth regions BW1 and BW3 are for downlink transmission.

Example Embodiment 10: The wireless terminal of Example Embodiment 9, wherein the processor circuitry is configured to determine the time duration based on signaling from an access node of a radio access network.

Example Embodiment 11: The wireless terminal of Example Embodiment 8, wherein processor circuitry is configured make the selection of the first formula in a first time domain region and to make the selection of the second formula in a second time domain region, and wherein the processor circuitry determines the time resource allocated for the uplink transmission as being in the first time domain region when frequency resource for the uplink transmission is confined to an intermediate bandwidth region BW2 between bandwidth regions BW2 and BW3.

Example Embodiment 12: The wireless terminal of Example Embodiment 8, wherein processor circuitry is configured make the selection of the first formula in a first time domain region and to make the selection of the second formula in a second time domain region, and wherein the wireless terminal further comprises receiver circuitry configured to receive an indication over the radio interface whether the time resource for the uplink transmission is in the first time domain region or the second time domain region.

Example Embodiment 13: The wireless terminal of Example Embodiment 8, wherein the wireless terminal further comprises receiver circuitry configured to receive over the radio interface an indication of bandwidth regions of a cell, and wherein the processor circuitry is configured:

to make the selection of the first formula when the uplink transmission is not confined within a bandwidth region of the cell;

to make the selection of the second formula when the uplink transmission is confined within the bandwidth region of the cell.

Example Embodiment 14: A method in a wireless terminal of a cellular telecommunication system, the wireless terminal communicating over a radio interface with an access node of a radio access network, the method comprising:

making a selection between different formulae for determining an allocation type for an uplink transmission on an uplink channel, the allocation type being a parameter utilized by the processor to determine a configured maximum transmission power parameter for a carrier for the uplink channel upon which the uplink transmission is transmitted, a type of the allocation type being determined depending on location of an allocated resource block for the uplink channel relative to channel bandwidth;

transmitting the uplink transmission over the radio interface using transmission power determined by the configured maximum transmission power parameter.

Example Embodiment 15: A wireless terminal of a cellular telecommunication system, the wireless terminal communicating over a radio interface with an access node of a radio access network, the wireless terminal comprising:

processor circuitry configured to make a selection between different criteria for determining an allocation type for an uplink transmission on an uplink channel, the allocation type being a parameter utilized by the processor to determine a parameter for configured maximum transmission power parameter for the uplink channel upon which the uplink transmission is transmitted, a type of the allocation type being determined depending on location of an allocated resource block for the uplink channel relative to channel bandwidth;

transmitter circuitry configured to transmit the uplink transmission over the radio interface using transmission power determined in dependence on the configured maximum transmission power parameter.

Example Embodiment 16: A wireless terminal of a cellular telecommunication system, the wireless terminal communicating over a radio interface with an access node of a radio access network, the wireless terminal comprising:

receiver circuitry configured to receive, over the radio interface, information upon which determination of allocation type determination formula(e) is dependent;

processor circuitry configured to:

use the received information to determine which allocation type determination formula(e) is to be used to determine an allocation type;

use the allocation type determination formula(e) to determine the allocation type, a type of the allocation type being determined depending on location of an allocated resource block for the uplink channel relative to channel bandwidth;

use the allocation type to determine a parameter for a configured maximum transmission power for an uplink channel upon which an uplink transmission is transmitted.

Example Embodiment 17: The wireless terminal of Example Embodiment 16, further comprising transmitter circuitry configured to transmit the uplink transmission over the radio interface using transmission power determined by the parameter.

Example Embodiment 18: The wireless terminal of Example Embodiment 16, wherein the received information is used to determine either (1) one of a first allocation type determination formula and a second allocation type determination formula, or (2) both a first allocation type determination formula and a second allocation type determination formula.

Example Embodiment 19: The wireless terminal of Example Embodiment 16, wherein in accordance with the first allocation type formulae the allocation type is determined to be:

an edge resource block allocation in a case that (1) the allocated resource blocks are at a lowermost or uppermost edge of the channel bandwidth and (2) a number of resource blocks ($L_{CRB}$) allocated for the uplink transmission is equal to or smaller than predefined integer M;

an inner resource block allocation in a case that (1) $RB_{Start,Low} \leq RB_{Start} \leq RB_{Start,High}$, and (2) $L_{CRB} \leq$ ceil ($N_{RB}/M$), wherein $$BR_{Start,Low} = \max(1, \text{floor}(L_{CRB}/M));$$

$$RB_{Start,High} = N_{RB} - RB_{Start,Low} - L_{CRB};$$

$N_{RB}$ is a number of resource blocks for a maximum transmission bandwidth configuration for a given channel bandwidth;

ceil(DX) represents a ceiling function for a real number DX; and floor(CX) represents a floor function for a real number CX.

Example Embodiment 20: The wireless terminal of Example Embodiment 18, wherein the allocation type is determined according to one of the following alternatives of the second allocation type formulae:

according to a first alternative the allocation type is determined to be a specific allocation type regardless of whether the allocated resource blocks are at the lowermost or uppermost edge of the channel bandwidth, and regardless of (1) a number of resource blocks ($L_{CRB}$) allocated for the uplink transmission and (2) a number $N_{RB}$ of resource blocks for a maximum transmission bandwidth configuration for a given channel bandwidth;

according to a second alternative the allocation type is determined to be:

an edge resource block allocation in a case that (1) the allocated resource blocks are at a lowermost or an uppermost edge of the channel bandwidth, and (2) $L_{CRB}$ is equal to or smaller than a predefined integer M;

a specific allocation type regardless of $L_{CRB}$ and $N_{RB}$ for all other cases;

according to a third alternative, when the channel is an intermediate channel in a frequency range between two other channels and $N_{RB}$ is the number of resource blocks in the intermediate channel, the allocation type is determined to be:

an edge RB allocation in a case that (1) the allocated resource blocks are at a lowermost or uppermost edge of the channel bandwidth and (2) the number of resource blocks ($L_{CRB}$) allocated for the uplink transmission is equal to or smaller than the predefined integer M;

an inner RB allocation in a case that (1) $RB_{Start,Low} \leq RB_{start} \leq RB_{Start,High}$, and (2) $L_{CRB} \leq ceil(N_{RB}/M)$, wherein $$B_{Start,Low} = \max(1, \text{floor}(L_{CRB}/M)); \text{ and}$$

$$RB_{Start,High} = N_{RB} - RB_{Start,Low} - L_{CRB};$$

ceil(DX) represents a ceiling function for a real number DX; and floor(CX) represents a floor function for a real number CX.

Example Embodiment 21: The wireless terminal of Example Embodiment 18, wherein the received information is used to determine one of a first allocation type determination formula and a second allocation type determination formula, and wherein the processor circuitry is configured to use the specified allocation type determination formula to determine the allocation type.

Example Embodiment 22: The wireless terminal of Example Embodiment 18, wherein the received information is used to determine both a first allocation type determination formula and a second allocation type determination formula, and wherein the processor circuitry is configured to:

determine a first maximum power reduction parameter using a first allocation type determined using the first allocation type determination formula;

determine a second maximum power reduction parameter using a second allocation type determined using the second allocation type determination formula;

make a selection of the first maximum power reduction parameter and the second maximum power reduction parameter.

Example Embodiment 23: The wireless terminal of Example Embodiment 22, the processor circuitry is configured to a greatest of the first maximum power reduction parameter and the second maximum power reduction parameter.

Example Embodiment 24: The wireless terminal of Example Embodiment 16, wherein the received information upon which the determination of the allocation type determination formula(e) is dependent comprises an identification of multiple bandwidth regions for a cell, and wherein the processor circuitry is configured to determine which allocation type determination formula(e) is to be used to determine an allocation type depending on to which of the multiple bandwidth regions the uplink transmission is confined.

Example Embodiment 25: The wireless terminal of Example Embodiment 24, wherein the processor circuitry is configured:

to use a second formula in a case that the uplink transmission is confined within a bandwidth region which is located at an edge of the cell among the multiple bandwidth regions;

to use a first formula in a case that the uplink transmission is confined within a bandwidth region which is not located at an edge of the cell among the multiple bandwidth regions.

Example Embodiment 26: The wireless terminal of Example Embodiment 25, wherein the processor circuitry is configured:

to use both a first formula and a second formula in a case that the uplink transmission is confined within a bandwidth region which is located at an edge of the cell among the multiple bandwidth regions;

to use a first formula in a case that the uplink transmission is confined within a bandwidth region which is not located at an edge of the cell among the multiple bandwidth regions.

Example Embodiment 27: A method in a wireless terminal of a cellular telecommunication system which communicates over a radio interface with an access node of a radio access network, the method comprising:

receiving, over the radio interface, information upon which determination of allocation type determination formula(e) is dependent;

using the received information to determine which allocation type determination formula(e) is to be used to determine an allocation type;

using the allocation type determination formula(e) to determine the allocation type, a type of the allocation type being determined depending on location of an allocated resource block for the uplink channel relative to channel bandwidth;

using the allocation type to determine a parameter for a configured maximum transmission power for an uplink channel upon which an uplink transmission is transmitted; and transmitting the uplink transmission over the radio interface using transmission power determined by the parameter.

Example Embodiment 28: An access node of a radio access network of a cellular telecommunication system, the access node communicating over a radio interface with a wireless terminal, the access node comprising:

processor circuitry configured to store information upon which determination of allocation type determination formula(e) is dependent; and transmitter circuitry configured to transmit, over the radio interface, the information upon which the determination of the allocation type determination formula(e) is dependent.

Example Embodiment 29: The access node of Example Embodiment 28, wherein the received information is used to determine either (1) one of a first allocation type determination formula and a second allocation type determination formula, or (2) both a first allocation type determination formula and a second allocation type determination formula.

Example Embodiment 30 The access node of Example Embodiment 28, wherein the received information upon which the determination of the allocation type determination formula(e) is dependent comprises an identification of multiple bandwidth regions for a cell, and wherein the processor circuitry is configured to determine which allocation type determination formula(e) is to be used to determine an allocation.

4.0 Further Considerations

It should be understood that the various foregoing example embodiments and modes may be utilized in conjunction with one or more example embodiments and modes described herein.

Figure 12:
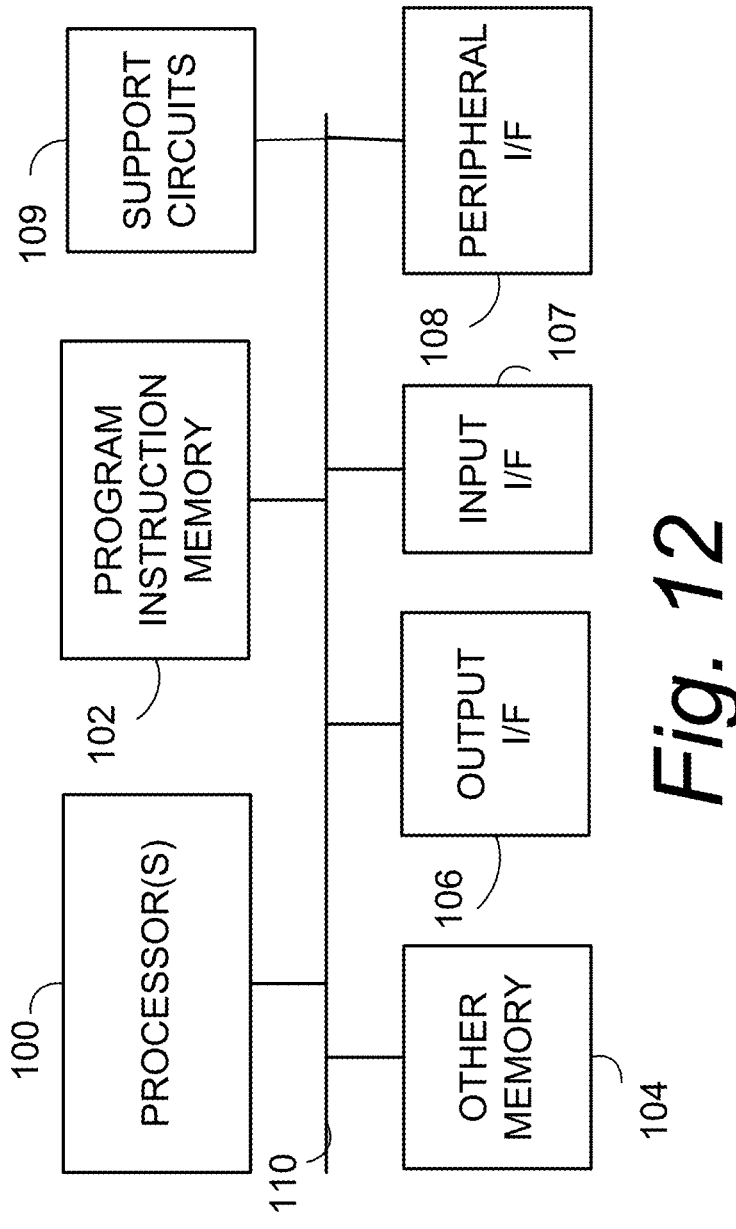
FIG. 12 is a diagrammatic view showing example elements comprising electronic machinery which may comprise a wireless terminal, a radio access node, and a core network node according to an example embodiment and mode.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C Certain units and functionalities of the systems 20 may be implemented by electronic machinery. For example, electronic machinery may refer to the processor circuitry described herein, such as terminal processor circuitry 60 and base station processor 34. Moreover, the term "processor circuitry" is not limited to mean one processor, but may include plural processors, with the plural processors operating at one or more sites. Moreover, as used herein the term "server" is not confined to one server unit but may encompass plural servers and/or other electronic equipment and may be co-located at one site or distributed to different sites. With these understandings, FIG. 12 shows an example of electronic machinery, e.g., processor circuitry, as comprising one or more processors 100, program instruction memory 102; other memory 104 (e.g., RAM, cache, etc.); input/output interfaces 106 and 107, peripheral interfaces 108; support circuits 109; and busses 110 for communication between the aforementioned units. The processor(s) 100 may comprise the processor circuitries described herein, for example, terminal processor circuitry 60 and node processor circuitry 34, or any processor(s) of a network entity of the core network.

A memory or register described herein may be depicted by memory 104, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 109 are coupled to the processors 100 for supporting the processor in a conventional manner. These circuits include cache, power supplies, clock circuits, input/output circuitry and subsystems, and the like.

The term "configured" may relate to the capacity of a device whether the device is in an operational or non-operational state. Configured may also refer to specific settings in a device that effect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves reception and transmission in a telecommunications system, such as by mitigating cross link interference, for example.

One or more of the following documents may be pertinent to the technology disclosed herein (all of which are incorporated herein by reference in their entirety):

3GPP TSG RAN Meeting #97-e, RP-222251, Multi-carrier enhancements for NR, Electronic meeting, Sep. 12-16, 2022.

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal of a cellular telecommunication system, the wireless terminal communicating over a radio interface with an access node of a radio access network, the wireless terminal comprising:

receiver circuitry configured to receive, over the radio interface, information upon which a determination of one or more allocation type determination formulas is dependent;

processor circuitry configured to:

use the received information to determine the one or more allocation type determination formulas that are to be used to determine an allocation type, use the one or more allocation type determination formulas to determine the allocation type, a type of the allocation type being determined depending on a location of an allocated resource block for an uplink channel relative to a channel bandwidth, and use the allocation type to determine a parameter for a configured maximum transmission power for the uplink channel over which uplink data is transmitted, wherein the received information is used to determine either one of a first allocation type determination formula and a second allocation type determination formula, or both the first allocation type determination formula and the second allocation type determination formula, and wherein the allocation type is determined according to:

a first alternative, in which the allocation type is determined to be a specific allocation type regardless of whether the allocated resource blocks is at a lowermost edge or an uppermost edge of the channel bandwidth, and regardless of a number of resource blocks ($L_{CRB}$) allocated for the uplink data, and regardless of a number $N_{RB}$ of resource blocks for a maximum transmission bandwidth configuration for a given channel bandwidth, a second alternative, in which the allocation type is determined to be:

an edge resource block (RB) allocation in a case that the allocated resource blocks is at the lowermost edge or the uppermost edge of the channel bandwidth, and $L_{CRB}$ is equal to or smaller than a predefined integer M, and the specific allocation type regardless of $L_{CRB}$ and $N_{RB}$ for all other cases, and a third alternative, in which, when a channel is an intermediate channel in a frequency range between two other channels and $N_{RB}$ is the number of resource blocks in the intermediate channel, the allocation type is determined to be:

the edge RB allocation in a case that the allocated resource blocks is at the lowermost edge or the uppermost edge of the channel bandwidth, and $L_{CRB}$ is equal to or smaller than the predefined integer M, and an inner RB allocation in a case that $RB_{Start,Low} \leq RB_{Start} \leq RB_{Start,High}$, and $L_{CRB} \leq$ ceil($N_{RB}$/M), wherein;

$$B_{Start,Low} = \max(1, \text{floor}(L_{CRB}/M)),$$

$$RB_{Start,High} = N_{RB} - RB_{Start,Low} - L_{CRB},$$

ceil($N_{RB}$/M) represents a ceiling function for a real number $N_{RB}$/M, and floor ($L_{CRB}$/M) represents a floor function for a real number $L_{CRB}$/M.

2. The wireless terminal of claim 1, further comprising transmitter circuitry configured to transmit the uplink data over the radio interface using the configured maximum transmission power determined by the parameter.

3. The wireless terminal of claim 1, wherein the received information comprises an identification of a plurality of bandwidth regions for a cell, and wherein determining the one or more allocation type determination formulas that are to be used to determine the allocation type is depending on to which of the plurality of bandwidth regions the uplink data is confined.

4. The wireless terminal of claim 3, wherein the processor circuitry is further configured to:

use a first formula in a case that the uplink data is confined within a bandwidth region which is located at an edge of the cell among the plurality of bandwidth regions, and use a second formula in a case that the uplink data is confined within a bandwidth region which is not located at the edge of the cell among the plurality of bandwidth regions.

5. The wireless terminal of claim 3, wherein the processor circuitry is configured to:

use both a first formula and a second formula in a case that the uplink data is confined within a bandwidth region which is located at an edge of the cell among the plurality of bandwidth regions, and use the first formula in a case that the uplink data is confined within a bandwidth region which is not located at the edge of the cell among the plurality of bandwidth regions.

6. A wireless terminal of a cellular telecommunication system, the wireless terminal communicating over a radio interface with an access node of a radio access network, the wireless terminal comprising:

receiver circuitry configured to receive, over the radio interface, information upon which a determination of one or more allocation type determination formulas is dependent;

processor circuitry configured to:

use the received information to determine the one or more allocation type determination formulas that are to be used to determine an allocation type, use the one or more allocation type determination formulas to determine the allocation type, a type of the allocation type being determined depending on a location of an allocated resource block for an uplink channel relative to a channel bandwidth, and use the allocation type to determine a parameter for a configured maximum transmission power for the uplink channel over which uplink data is transmitted, wherein the received information is used to determine both a first allocation type determination formula and a second allocation type determination formula, wherein the processor circuitry is further configured to:

determine a first maximum power reduction parameter using a first allocation type determined using the first allocation type determination formula, determine a second maximum power reduction parameter using a second allocation type determined using the second allocation type determination formula, and make a selection of the first maximum power reduction parameter and the second maximum power reduction parameter, and wherein the allocation type is determined according to:

a first alternative, in which the allocation type is determined to be a specific allocation type regardless of whether the allocated resource blocks is at a lowermost edge or an uppermost edge of the channel bandwidth, and regardless of a number of resource blocks ($L_{CRB}$) allocated for the uplink data, and regardless of a number $N_{RB}$ of resource blocks for a maximum transmission bandwidth configuration for a given channel bandwidth, a second alternative, in which the allocation type is determined to be:

an edge resource block (RB) allocation in a case that the allocated resource blocks is at the lowermost edge or the uppermost edge of the channel bandwidth, and $L_{CRB}$ is equal to or smaller than a predefined integer M, and the specific allocation type regardless of $L_{CRB}$ and $N_{RB}$ for all other cases, and a third alternative, in which, when a channel is an intermediate channel in a frequency range between two other channels and $N_{RB}$ is the number of resource blocks in the intermediate channel, the allocation type is determined to be:

the edge RB allocation in a case that the allocated resource blocks is at the lowermost edge or the uppermost edge of the channel bandwidth, and $L_{CRB}$ is equal to or smaller than the predefined integer M, and an inner RB allocation in a case that $RB_{Start,Low} \leq RB_{Start} \leq RB_{Start,High}$, and $L_{CRB} \leq$ ceil ($N_{RB}$/M), wherein;

$$B_{Start,Low} = \max(1, \text{floor}(L_{CRB}/M)),$$

$$RB_{Start,High} = N_{RB} - RB_{Start,Low} - L_{CRB},$$

ceil($N_{RB}$/M) represents a ceiling function for a real number $N_{RB}$/M, and floor($L_{CRB}$/M) represents a floor function for a real number $L_{CRB}$/M.

7. A method performed by a wireless terminal of a cellular telecommunication system, the wireless terminal communicating over a radio interface with an access node of a radio access network, the method comprising:

receiving, over the radio interface, information upon which a determination of one ore more allocation type determination formulas is dependent;

using the received information to determine the one or more allocation type determination formulas that are to be used to determine an allocation type;

using the one or more allocation type determination formulas to determine the allocation type, a type of the allocation type being determined depending on a location of an allocated resource block for an uplink channel relative to a channel bandwidth;

using the allocation type to determine a parameter for a configured maximum transmission power for the uplink channel upon which uplink data is transmitted by at least:

determining a first maximum power reduction parameter using a first allocation type determined using a first allocation type determination formula;

determining a second maximum power reduction parameter using a second allocation type determined using a second allocation type determination formula; and making a selection of the first maximum power reduction parameter and the second maximum power reduction parameter;

transmitting the uplink data over the radio interface using the configured maximum transmission power determined by the parameter; and determining the allocation type according to:

a first alternative, in which the allocation type is determined to be a specific allocation type regardless of whether the allocated resource blocks is at a lowermost edge or an uppermost edge of the channel bandwidth, and regardless of a number of resource blocks ($L_{CRB}$) allocated for the uplink data, and regardless of a number $N_{RB}$ of resource blocks for a maximum transmission bandwidth configuration for a given channel bandwidth, a second alternative, in which the allocation type is determined to be:

an edge resource block (RB) allocation in a case that the allocated resource blocks is at the lowermost edge or the uppermost edge of the channel bandwidth, and $L_{CRB}$ is equal to or smaller than a predefined integer M, and the specific allocation type regardless of $L_{CRB}$ and $N_{RB}$ for all other cases, and a third alternative, in which, when a channel is an intermediate channel in a frequency range between two other channels and $N_{RB}$ is the number of resource blocks in the intermediate channel, the allocation type is determined to be:

the edge RB allocation in a case that the allocated resource blocks is at the lowermost edge or the uppermost edge of the channel bandwidth, and $L_{CRB}$ is equal to or smaller than the predefined integer M, and an inner RB allocation in a case that $RB_{Start,Low} \leq RB_{Start} \leq RB_{Start,High}$, and $L_{CRB} \leq \text{ceil}(N_{RB}/M)$, wherein;

$$B_{Start,Low} = \max(1, \text{floor}(L_{CRB}/M)),$$

$$RB_{Start,High} = N_{RB} - RB_{Start,Low} - L_{CRB},$$

$\text{ceil}(N_{RB}/M)$ represents a ceiling function for a real number $N_{RB}/M$, and $\text{floor}(L_{CRB}/M)$ represents a floor function for a real number $L_{CRB}/M$.

* * * * *